(12) United States Patent
Pelletier et al.

(10) Patent No.: US 11,968,734 B2
(45) Date of Patent: Apr. 23, 2024

(54) METHOD AND APPARATUS FOR PROVIDING INFORMATION TO A NETWORK

(71) Applicant: INTERDIGITAL PATENT HOLDINGS, INC., Wilmington, DE (US)

(72) Inventors: Ghyslain Pelletier, Montréal (CA); Ulises Olvera-Hernandez, London (GB); Mahmoud Watfa, Saint Leonard (CA); Saad Ahmad, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 88 days.

(21) Appl. No.: 17/199,046

(22) Filed: Mar. 11, 2021

(65) Prior Publication Data

US 2021/0274586 A1    Sep. 2, 2021

Related U.S. Application Data

(63) Continuation of application No. 15/923,460, filed on Mar. 16, 2018, now abandoned, which is a (Continued)

(51) Int. Cl.
*H04W 76/27* (2018.01)
*H04W 72/12* (2023.01)
*H04W 72/566* (2023.01)

(52) U.S. Cl.
CPC ....... *H04W 76/27* (2018.02); *H04W 72/1221* (2013.01); *H04W 72/569* (2023.01)

(58) Field of Classification Search
CPC ............. H04W 76/27; H04W 72/1242; H04W 72/1221
See application file for complete search history.

(56) References Cited

U.S. PATENT DOCUMENTS

| | | | |
|---|---|---|---|
| 6,091,362 A | 7/2000 | Stilp et al. | |
| 6,195,705 B1 | 2/2001 | Leung | |

(Continued)

FOREIGN PATENT DOCUMENTS

| | | |
|---|---|---|
| CN | 101047881 A | 10/2007 |
| CN | 101047984 A | 10/2007 |

(Continued)

OTHER PUBLICATIONS

Huawei, "Discussion on State Transition," TSG-RAN WG2 #53, R2-061428, Shanghai, China (May 8-12, 2006).

(Continued)

*Primary Examiner* — Parth Patel
(74) *Attorney, Agent, or Firm* — Volpe Koenig

(57) ABSTRACT

Method and apparatus for providing information to a network are disclosed. An eNodeB (eNB) may receive pattern information relating to connection state management behavior of a wireless transmit/receive unit (WTRU). The eNB may receive this information over S1 signaling when a connection is established. The eNB may determine a time factor for connection state management, wherein the time factor may be based on the received information. The determine time factor may be used to adjust connection states of the WTRU.

6 Claims, 9 Drawing Sheets

Related U.S. Application Data continuation of application No. 15/499,600, filed on Apr. 27, 2017, now abandoned, which is a continuation of application No. 13/436,457, filed on Mar. 30, 2012, now Pat. No. 9,648,657.

(60) Provisional application No. 61/470,953, filed on Apr. 1, 2011, provisional application No. 61/555,653, filed on Nov. 4, 2011, provisional application No. 61/591,389, filed on Jan. 27, 2012, provisional application No. 61/611,974, filed on Mar. 16, 2012.

(56) References Cited

U.S. PATENT DOCUMENTS

| | | |
|---|---|---|
| 6,434,367 B1 | 8/2002 | Kumar et al. |
| 7,031,709 B2 | 4/2006 | Watanbe et al. |
| 7,702,364 B2 | 4/2010 | Ray et al. |
| 7,881,261 B2 | 2/2011 | Julka et al. |
| 8,054,758 B2 | 11/2011 | Chun et al. |
| 8,254,324 B2 * | 8/2012 | Bahk ............... H04W 72/121 370/329 |
| 8,345,571 B2 | 1/2013 | Kwon et al. |
| 8,428,610 B2 | 4/2013 | Chowdhury et al. |
| 8,514,793 B2 * | 8/2013 | Gauvreau ............ H04W 24/08 370/468 |
| 8,571,091 B2 * | 10/2013 | Dalsgaard ............ H04W 76/45 370/278 |
| 8,578,503 B2 | 11/2013 | Kim et al. |
| 8,639,210 B2 | 1/2014 | Uemura et al. |
| 8,681,672 B2 | 3/2014 | Park |
| 8,699,393 B2 * | 4/2014 | Cai ..................... H04W 76/28 370/311 |
| 8,755,313 B2 | 6/2014 | Damnjanovic et al. |
| 8,826,052 B1 | 9/2014 | Vaidya et al. |
| 8,953,548 B2 * | 2/2015 | Gauvreau ............ H04L 5/0098 370/468 |
| 8,973,092 B2 | 3/2015 | Kanoun et al. |
| 9,155,121 B2 | 10/2015 | Rayavarapu |
| 9,240,860 B2 * | 1/2016 | Son ..................... H04L 1/0027 |
| 9,265,087 B2 | 2/2016 | Lee et al. |
| 9,351,290 B2 * | 5/2016 | Gauvreau ......... H04W 72/0413 |
| 9,537,643 B2 * | 1/2017 | Gauvreau ............ H04W 24/02 |
| 9,635,579 B2 | 4/2017 | Wang et al. |
| 9,706,601 B1 | 7/2017 | Kiraly et al. |
| 9,774,483 B2 | 9/2017 | Ito |
| 9,942,021 B2 * | 4/2018 | Gauvreau ............ H04L 5/0098 |
| 11,095,421 B2 * | 8/2021 | Gauvreau ........... H04W 72/048 |
| 2001/0015963 A1 | 8/2001 | Tuomainen et al. |
| 2002/0172178 A1 | 11/2002 | Suzuki et al. |
| 2002/0181423 A1 | 12/2002 | Chen et al. |
| 2003/0148779 A1 | 8/2003 | Aravamudan et al. |
| 2003/0211847 A1 | 11/2003 | Jang et al. |
| 2004/0127244 A1 | 7/2004 | Matsumoto et al. |
| 2004/0218555 A1 | 11/2004 | Chen et al. |
| 2004/0224669 A1 | 11/2004 | Pedlar et al. |
| 2004/0224686 A1 | 11/2004 | Pedlar |
| 2005/0002414 A1 | 1/2005 | Miyaoka |
| 2005/0009515 A1 | 1/2005 | Inoko |
| 2005/0172026 A1 | 8/2005 | Jeon et al. |
| 2005/0185623 A1 | 8/2005 | Ray et al. |
| 2005/0226202 A1 * | 10/2005 | Zhang ................. H04L 47/245 370/352 |
| 2005/0265373 A1 * | 12/2005 | Khan .................. H04L 1/0026 370/437 |
| 2005/0270981 A1 | 12/2005 | Shaheen et al. |
| 2006/0062180 A1 | 3/2006 | Sayeedi et al. |
| 2006/0172738 A1 | 8/2006 | Kwon et al. |
| 2006/0203738 A1 | 9/2006 | Fok et al. |
| 2006/0240859 A1 * | 10/2006 | Gervais ............... H04W 52/286 455/69 |
| 2007/0047493 A1 | 3/2007 | Park et al. |
| 2007/0066273 A1 | 3/2007 | Laroia et al. |
| 2007/0097914 A1 * | 5/2007 | Grilli ................ H04W 36/0088 455/450 |
| 2007/0160017 A1 | 7/2007 | Meier et al. |
| 2007/0177617 A1 * | 8/2007 | Noh ..................... H04W 76/19 370/352 |
| 2007/0213060 A1 | 9/2007 | Shaheen |
| 2007/0259675 A1 | 11/2007 | Worrall |
| 2008/0009328 A1 | 1/2008 | Narasimha |
| 2008/0026768 A1 | 1/2008 | Fok et al. |
| 2008/0075048 A1 | 3/2008 | Suszko |
| 2008/0076386 A1 | 3/2008 | Khetawat et al. |
| 2008/0095090 A1 | 4/2008 | Lee et al. |
| 2008/0101271 A1 | 5/2008 | Kwon et al. |
| 2008/0102896 A1 | 5/2008 | Wang et al. |
| 2008/0108346 A1 | 5/2008 | Umatt et al. |
| 2008/0167054 A1 | 7/2008 | Shaheen |
| 2008/0188200 A1 | 8/2008 | Forsberg |
| 2008/0212506 A1 | 9/2008 | Lee et al. |
| 2008/0220782 A1 | 9/2008 | Wang et al. |
| 2008/0225801 A1 | 9/2008 | Turk |
| 2008/0280594 A1 | 11/2008 | Voyer et al. |
| 2008/0280620 A1 | 11/2008 | Chin et al. |
| 2008/0285492 A1 | 11/2008 | Vesterinen |
| 2008/0293419 A1 | 11/2008 | Somasundaram et al. |
| 2009/0005029 A1 | 1/2009 | Wang et al. |
| 2009/0025060 A1 | 1/2009 | Mukherjee et al. |
| 2009/0034452 A1 | 2/2009 | Somasundaram et al. |
| 2009/0046573 A1 | 2/2009 | Damnjanovic |
| 2009/0046641 A1 | 2/2009 | Wang et al. |
| 2009/0075667 A1 | 3/2009 | Bourlas |
| 2009/0092091 A1 * | 4/2009 | Balasubramanian ........ H04W 76/38 370/329 |
| 2009/0111428 A1 | 4/2009 | Blommaert et al. |
| 2009/0129342 A1 | 5/2009 | Hwang et al. |
| 2009/0135769 A1 | 5/2009 | Sambhwani et al. |
| 2009/0135771 A1 | 5/2009 | Pani et al. |
| 2009/0156196 A1 | 6/2009 | Somasundaram et al. |
| 2009/0168731 A1 | 7/2009 | Zhang et al. |
| 2009/0170426 A1 | 7/2009 | Jung et al. |
| 2009/0181712 A1 * | 7/2009 | Xu ..................... H04L 1/0026 455/522 |
| 2009/0201842 A1 | 8/2009 | Guan |
| 2009/0207794 A1 * | 8/2009 | Meylan ................. H04W 76/28 370/329 |
| 2009/0213800 A1 | 8/2009 | Lee et al. |
| 2009/0232019 A1 | 9/2009 | Gupta et al. |
| 2009/0238143 A1 | 9/2009 | Mukherjee et al. |
| 2009/0247176 A1 | 10/2009 | Song et al. |
| 2009/0268673 A1 | 10/2009 | Roberts |
| 2009/0268689 A1 | 10/2009 | Fu et al. |
| 2009/0296934 A1 | 12/2009 | Qing et al. |
| 2009/0316575 A1 * | 12/2009 | Gholmieh ............ H04W 76/20 370/225 |
| 2009/0316659 A1 * | 12/2009 | Lindoff ................ H04W 48/16 370/332 |
| 2009/0325526 A1 | 12/2009 | Chen et al. |
| 2010/0003994 A1 | 1/2010 | Akiyama |
| 2010/0009682 A1 | 1/2010 | Iwamura et al. |
| 2010/0027446 A1 * | 2/2010 | Choi ................... H04W 72/042 370/280 |
| 2010/0067497 A1 | 3/2010 | Chmiel et al. |
| 2010/0087208 A1 | 4/2010 | Lister |
| 2010/0095123 A1 | 4/2010 | He |
| 2010/0105377 A1 | 4/2010 | Iwamura et al. |
| 2010/0111028 A1 | 5/2010 | Kim et al. |
| 2010/0118752 A1 | 5/2010 | Suzuki et al. |
| 2010/0118811 A1 | 5/2010 | Lee et al. |
| 2010/0120432 A1 | 5/2010 | Watfa et al. |
| 2010/0124934 A1 | 5/2010 | Mach |
| 2010/0128646 A1 | 5/2010 | Gao |
| 2010/0128722 A1 | 5/2010 | Madour et al. |
| 2010/0135159 A1 * | 6/2010 | Chun ................ H04W 52/0216 370/241 |
| 2010/0142367 A1 | 6/2010 | Zhang et al. |
| 2010/0165940 A1 | 7/2010 | Watfa et al. |
| 2010/0177897 A1 | 7/2010 | Mildh |
| 2010/0178920 A1 | 7/2010 | Kitazoe et al. |
| 2010/0184458 A1 | 7/2010 | Fodor et al. |
| 2010/0189071 A1 | 7/2010 | Kitazoe et al. |

(56) References Cited

U.S. PATENT DOCUMENTS

| | | |
|---|---|---|
| 2010/0190488 A1 | 7/2010 | Jung et al. |
| 2010/0210269 A1 | 8/2010 | Shuai |
| 2010/0227627 A1 | 9/2010 | Ishii et al. |
| 2010/0232607 A1 | 9/2010 | Nimura et al. |
| 2010/0255810 A1 | 10/2010 | Itaba |
| 2010/0260108 A1 | 10/2010 | Song et al. |
| 2010/0279692 A1 | 11/2010 | Hapsari et al. |
| 2010/0279697 A1 | 11/2010 | Yang et al. |
| 2010/0284387 A1 | 11/2010 | Zhao et al. |
| 2010/0290509 A1 | 11/2010 | Dalsgaard et al. |
| 2010/0291939 A1 | 11/2010 | Jen et al. |
| 2010/0316021 A1 | 12/2010 | Lerzer et al. |
| 2010/0329210 A1 | 12/2010 | Shirota et al. |
| 2011/0002292 A1 | 1/2011 | Wang et al. |
| 2011/0014891 A1 | 1/2011 | Bleckert et al. |
| 2011/0038347 A1 | 2/2011 | Patil et al. |
| 2011/0039552 A1 | 2/2011 | Narasimha et al. |
| 2011/0044283 A1 | 2/2011 | Rubin et al. |
| 2011/0072488 A1 | 3/2011 | Bi et al. |
| 2011/0075675 A1 | 3/2011 | Koodli et al. |
| 2011/0076987 A1 | 3/2011 | Lee et al. |
| 2011/0080864 A1 | 4/2011 | Cai et al. |
| 2011/0085460 A1 | 4/2011 | Zhang et al. |
| 2011/0086635 A1 | 4/2011 | Grob-Lipski |
| 2011/0105109 A1 | 5/2011 | Uemura et al. |
| 2011/0110327 A1 | 5/2011 | Ramachandran et al. |
| 2011/0111785 A1* | 5/2011 | Lindoff ................ H04W 40/16 455/509 |
| 2011/0122783 A1 | 5/2011 | Lin et al. |
| 2011/0124357 A1 | 5/2011 | Kim et al. |
| 2011/0134757 A1 | 6/2011 | Lin et al. |
| 2011/0145421 A1 | 6/2011 | Yao et al. |
| 2011/0149913 A1 | 6/2011 | Park et al. |
| 2011/0151882 A1 | 6/2011 | Hwang et al. |
| 2011/0165878 A1 | 7/2011 | Nylander et al. |
| 2011/0171979 A1 | 7/2011 | Rune |
| 2011/0176414 A1 | 7/2011 | De Franca Lima et al. |
| 2011/0176450 A1 | 7/2011 | Kubota |
| 2011/0176530 A1 | 7/2011 | Vikberg et al. |
| 2011/0183661 A1 | 7/2011 | Yi et al. |
| 2011/0188455 A1 | 8/2011 | Suzuki et al. |
| 2011/0188485 A1 | 8/2011 | Fodor et al. |
| 2011/0191610 A1 | 8/2011 | Agarwal et al. |
| 2011/0199910 A1* | 8/2011 | Oh .................... H04W 52/0229 370/241 |
| 2011/0222450 A1 | 9/2011 | Youssef et al. |
| 2011/0235605 A1 | 9/2011 | Yeoum et al. |
| 2011/0243008 A1* | 10/2011 | Kim ...................... H04L 1/1893 370/252 |
| 2011/0243048 A1* | 10/2011 | Wang .................... H04L 1/1874 370/329 |
| 2011/0243106 A1 | 10/2011 | Hsu et al. |
| 2011/0269463 A1 | 11/2011 | Wang et al. |
| 2011/0269499 A1 | 11/2011 | Vikberg et al. |
| 2011/0274050 A1 | 11/2011 | Monma et al. |
| 2011/0274051 A1 | 11/2011 | Vikberg et al. |
| 2011/0274090 A1 | 11/2011 | Hallensal et al. |
| 2011/0286429 A1 | 11/2011 | Vikberg et al. |
| 2011/0292853 A1* | 12/2011 | Balasubramaniam ........................ H04W 52/0216 370/311 |
| 2011/0292893 A1 | 12/2011 | Lee et al. |
| 2011/0305183 A1 | 12/2011 | Hsu et al. |
| 2011/0305211 A1* | 12/2011 | Lunttila ................ H04L 5/0007 370/329 |
| 2011/0310804 A1 | 12/2011 | Beygzadeh |
| 2011/0310822 A1 | 12/2011 | Nair et al. |
| 2012/0003943 A1 | 1/2012 | Marinier et al. |
| 2012/0008535 A1 | 1/2012 | Kuehnel |
| 2012/0009952 A1 | 1/2012 | Zhang et al. |
| 2012/0014306 A1 | 1/2012 | Pelletier et al. |
| 2012/0015657 A1 | 1/2012 | Comsa et al. |
| 2012/0020393 A1 | 1/2012 | Patil |
| 2012/0040621 A1 | 2/2012 | Jung et al. |
| 2012/0052860 A1 | 3/2012 | Faronius et al. |
| 2012/0058797 A1* | 3/2012 | Gaal .................... H04W 52/228 455/522 |
| 2012/0063464 A1 | 3/2012 | Mehta |
| 2012/0069737 A1 | 3/2012 | Vikberg et al. |
| 2012/0069782 A1* | 3/2012 | Kuo ...................... H04W 76/28 370/311 |
| 2012/0071173 A1 | 3/2012 | Olsson et al. |
| 2012/0076121 A1 | 3/2012 | Choi et al. |
| 2012/0099417 A1 | 4/2012 | Sun et al. |
| 2012/0106423 A1 | 5/2012 | Nylander et al. |
| 2012/0113825 A1* | 5/2012 | Baglin .................. H04W 24/00 370/252 |
| 2012/0113904 A1 | 5/2012 | Anderson et al. |
| 2012/0134331 A1* | 5/2012 | Park .................... H04B 7/0632 370/329 |
| 2012/0142328 A1* | 6/2012 | Awoniyi ............... H04W 36/22 455/418 |
| 2012/0147830 A1 | 6/2012 | Lohr et al. |
| 2012/0155257 A1 | 6/2012 | Tiwari |
| 2012/0157033 A1 | 6/2012 | Ou et al. |
| 2012/0158806 A1 | 6/2012 | Snyder et al. |
| 2012/0159151 A1 | 6/2012 | Janakiraman et al. |
| 2012/0165013 A1 | 6/2012 | Nishida et al. |
| 2012/0166617 A1 | 6/2012 | Chang et al. |
| 2012/0167118 A1 | 6/2012 | Pingili et al. |
| 2012/0176926 A1* | 7/2012 | Jang .................... H04W 24/02 370/252 |
| 2012/0179789 A1 | 7/2012 | Griot et al. |
| 2012/0182908 A1 | 7/2012 | Pan et al. |
| 2012/0184282 A1 | 7/2012 | Malkamaki et al. |
| 2012/0195255 A1 | 8/2012 | Nylander et al. |
| 2012/0204253 A1 | 8/2012 | Sugimoto et al. |
| 2012/0207070 A1 | 8/2012 | Xu et al. |
| 2012/0208486 A1 | 8/2012 | Liao |
| 2012/0213137 A1* | 8/2012 | Jeong ................ H04W 52/0212 370/311 |
| 2012/0213207 A1* | 8/2012 | Jang .................... H04W 52/346 370/336 |
| 2012/0218929 A1 | 8/2012 | Son et al. |
| 2012/0220214 A1 | 8/2012 | Du et al. |
| 2012/0233635 A1 | 9/2012 | Hakola et al. |
| 2012/0233674 A1 | 9/2012 | Gladstone et al. |
| 2012/0236707 A1 | 9/2012 | Larsson et al. |
| 2012/0243417 A1 | 9/2012 | Henttonen et al. |
| 2012/0250578 A1 | 10/2012 | Pani et al. |
| 2012/0252451 A1 | 10/2012 | Knauft et al. |
| 2012/0269167 A1 | 10/2012 | Velev et al. |
| 2012/0281566 A1 | 11/2012 | Pelletier et al. |
| 2012/0281655 A1 | 11/2012 | Jung et al. |
| 2012/0282956 A1 | 11/2012 | Kim et al. |
| 2012/0294236 A1 | 11/2012 | Watfa et al. |
| 2012/0307700 A1 | 12/2012 | Nordberg et al. |
| 2013/0010631 A1 | 1/2013 | Jung et al. |
| 2013/0016639 A1* | 1/2013 | Xu ........................ H04W 24/08 370/329 |
| 2013/0016645 A1 | 1/2013 | Moriwaki et al. |
| 2013/0017779 A1 | 1/2013 | Song et al. |
| 2013/0017829 A1 | 1/2013 | Kim et al. |
| 2013/0022016 A1 | 1/2013 | Wei |
| 2013/0039202 A1* | 2/2013 | Feuersanger ............ H04L 5/001 370/252 |
| 2013/0044619 A1* | 2/2013 | Wallen ................ H04W 52/262 370/252 |
| 2013/0084883 A1 | 4/2013 | Mihaly |
| 2013/0183959 A1 | 7/2013 | Mihaly et al. |
| 2013/0203415 A1 | 8/2013 | Arvidsson et al. |
| 2013/0208711 A1* | 8/2013 | Van Lieshout ........ H04B 15/00 370/336 |
| 2013/0235779 A1 | 9/2013 | Kang et al. |
| 2013/0250902 A1 | 9/2013 | Xu et al. |
| 2013/0252643 A1 | 9/2013 | Park et al. |
| 2013/0272268 A1 | 10/2013 | Xu et al. |
| 2013/0343280 A1 | 12/2013 | Lee et al. |
| 2014/0051485 A1 | 2/2014 | Wang et al. |
| 2014/0106700 A1 | 4/2014 | Uemura et al. |

(56) References Cited

U.S. PATENT DOCUMENTS

| | | | |
|---|---|---|---|
| 2014/0233408 A1 | 8/2014 | Bontu et al. | |
| 2015/0044984 A1 | 2/2015 | Sammour et al. | |
| 2018/0324693 A1* | 11/2018 | Yu | H04W 52/0216 |

FOREIGN PATENT DOCUMENTS

| | | | | |
|---|---|---|---|---|
| CN | 101778455 A | * | 7/2010 | ........... H04L 1/1812 |
| EP | 1 478 200 | | 11/2004 | |
| JP | 2009-194671 | | 8/2009 | |
| JP | 2013-143664 | | 1/2012 | |
| WO | 09/072956 | | 6/2009 | |
| WO | 10/018801 | | 2/2010 | |
| WO | 10/059741 | | 5/2010 | |
| WO | WO-2010080922 A2 | * | 7/2010 | .......... H04W 72/042 |
| WO | 10/126326 | | 11/2010 | |
| WO | 11/019813 | | 2/2011 | |

OTHER PUBLICATIONS

Mitsubishi Electric, "Consideration on dormant mode of LTE active state," 3GPP TSG RAN WG3 Meeting #52, R3-060699, Shanghai, China (May 8-12, 2006).

NEC, "LTE MAC Dormant state characteristics and mobility," TSG-RAN Working Group2 #50, R2-060023, Sophia Antipolis, France (Jan. 9-13, 2006).

Panasonic, "Protocol States for E-UTRA," 3GPP TSG-RAN2#48, R2-051883, London, United Kingdom, (Aug. 28-Sep. 2, 2005).

Research in Motion UK Ltd et al., "New Work Item Proposal for LTE RAN Enhancements for Diverse Data Applications," 3GPP TSG RAN Meeting #51, RP-110454 (Mar. 15-18, 2011).

Research in Motion ULL Ltd., et al., "LTE RAN Enhancements for Diverse Data Applications—Core," 3GPP TSG RAN Meeting #53, Fukuoka, Japan, RP-111372 (Sep. 13-16, 2011).

Research in Motion UL Ltd., et al., "LTE RAN Enhancements for Diverse Data Applications Feature," 3GPP TSG RAN Meeting #53, Fukuoka, Japan, RP-111372 (Sep. 13-16, 2011).

Siemens, "States in E-UTRAN," 3GPP TSG-RAN WG RAN2#48, R2-052051, London, United Kingdom, (Aug. 29-Sep. 3, 2005).

Third Generation Partnership Project, "Specification Group Radio Access Network; Evolved Universal Terrestrial Radio Access (E-UTRA); User Equipment (UE) procedures in idle mode (Release 9)," 3GPP TS 36.304 V9.10.0 (Mar. 2012).

Third Generation Partnership Project, "Specification Group Radio Access Network; Evolved Universal Terrestrial Radio Access (E-UTRA); User Equipment (UE) procedures in idle mode (Release 10)," 3GPP TS 36.304 V10.5.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).

Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.9.0 (Sep. 2010).

Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.10.0 (Jun. 2011).

Third Generation Partnership Project, "Technical Specification Group Radio Access Network; Evolved Universal Terrestrial Radio Access (E-UTRA); User Equipment (UE) procedures in idle mode (Release 9)," 3GPP TS 36.304 V9.6.0 (Mar. 2011).

Third Generation Partnership Project, "Technical Specification Group Radio Access Network; Evolved Universal Terrestrial Radio Access (E-UTRA); User Equipment (UE) procedures in idle mode (Release 10)," 3GPP TS 36.304 V10.1.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.13.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.8.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).

(56) References Cited

OTHER PUBLICATIONS

Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0 (Mar. 2012).

Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.0.1 (Jan. 2011).

Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.5.0 (Mar. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.2.0 (Dec. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).

Third Generation Partnership Project, "Technical Specification Group Radio Access Network; Radio Resource Control (RRC); Protocol specification (Release 10)," 3GPP TS 25.331 V10.3.0 (Mar. 2011).

Third Generation Partnership Project, "Technical Specification Group Radio Access Network; Radio Resource Control (RRC); Protocol specification (Release 10)," 3GPP TS 25.331 V10.7.0 (Mar. 2012).

Third Generation Partnership Project, "Technical Specification Group Radio Access Network; Radio Resource Control (RRC); Protocol specification (Release 11)," 3GPP TS 25.331 V11.1.0 (Mar. 2012).

Ericsson, "RRC protocol states," TSG-RAN Working Group 2 (Radio layer 2 and Radio layer 3), TSGR2#6(99)807, Sophia Antipolis (Aug. 16-20, 1999).

\* cited by examiner

METHOD AND APPARATUS FOR PROVIDING INFORMATION TO A NETWORK

CROSS REFERENCE TO RELATED APPLICATIONS

This application is a continuation of U.S. patent application Ser. No. 15/923,460 filed Mar. 16, 2018, which is a continuation of U.S. patent application Ser. No. 15/499,600 filed Apr. 27, 2017, which is a continuation of Ser. No. 13/436,457 filed Mar. 30, 2012 and issued as U.S. Pat. No. 9,648,657 on May 9, 2017, which claims the benefit of U.S. provisional application Nos. 61/470,953 filed Apr. 1, 2011, 61/555,653 filed Nov. 4, 2011, 61/591,389 filed Jan. 27, 2012, and 61/611,974 filed Mar. 16, 2012, the contents of which are hereby incorporated by reference herein.

BACKGROUND

Third Generation Partnership Project (3GPP) Long Term Evolution (LTE) Release 8/9 (LTE R8/9) supports up to 100 Mbps in the downlink (DL), and 50 Mbps in the uplink (UL) for a 2×2 configuration. The LTE DL transmission scheme is based on an orthogonal frequency division multiple access (OFDMA) air interface.

For flexible deployment, LTE R8/9 systems support scalable transmission bandwidths, one of 1.4, 2.5, 5, 10, 15, or 20 MHz. In LTE, each radio frame (10 ms) comprises 10 equally sized sub-frames of 1 ms. Each sub-frame comprises 2 equally sized timeslots of 0.5 ms each. Either 7 or 6 orthogonal frequency division multiplex (OFDM) symbols exist per timeslot depending on the length of the cyclic prefix (CP). 7 symbols per timeslot are used with normal CP length, and 6 symbols per timeslot are used with the extended CP length. The sub-carrier spacing for the LTE is 15 kHz. An alternative reduced sub-carrier spacing mode using 7.5 kHz is also possible.

A resource element (RE) corresponds to one (1) sub-carrier during one (1) OFDM symbol interval. 12 consecutive sub-carriers during a 0.5 ms timeslot constitute one (1) resource block (RB). Therefore, with 7 symbols per timeslot, each RB consists of 12×7=84 REs. A DL carrier may comprise a scalable number of RBs, ranging from 6 RBs up to 110 RBs. This corresponds to an overall scalable transmission bandwidth of roughly 1 MHz up to 20 MHz. Normally, a set of common transmission bandwidths is specified, e.g., 1.4, 3, 5, 10, or 20 MHz.

The basic time-domain unit for dynamic scheduling is one sub-frame comprising two consecutive timeslots, which may be referred to as a resource-block pair. Certain sub-carriers on some OFDM symbols are allocated to carry pilot signals in the time-frequency grid. A given number of sub-carriers at the edges of the transmission bandwidth are not transmitted in order to comply with spectral mask requirements.

LTE-Advanced with carrier aggregation is an evolution that aims to improve single carrier LTE R8/9/10 data rates using, among other methods, bandwidth extensions (i.e., carrier aggregation). With carrier aggregation, a WTRU may transmit and receive simultaneously over a physical uplink shared channel (PUSCH) and a physical downlink shared channel (PDSCH), respectively, on multiple serving cells. Up to four secondary cells (SCells) may be configured in addition to a primary serving cell (PCell). It may support flexible bandwidth assignments up to 100 MHz.

The control information for the scheduling of PDSCH and PUSCH may be sent on one or more physical downlink control channels (PDCCHs). In addition to the LTE R8/9 scheduling using one PDCCH for a pair of UL and DL carriers, cross-carrier scheduling may be supported for a given PDCCH, allowing the network to provide PDSCH assignments and/or PUSCH grants for transmissions in other serving cell(s).

In LTE R8/9 and LTE Release 10 (R10) with single carrier configuration, where the network assigns a wireless transmit/receive unit (WTRU) one pair of UL and DL carriers, for any given subframe there is a single hybrid automatic repeat request (HARQ) process active for the UL and a single HARQ process active in the DL.

In LTE R10 with carrier aggregation configured, there is one HARQ entity for each serving cell. There may be more than one HARQ processes active for the UL and for the DL in any given subframe, but at most one UL and one DL HARQ process per configured serving cell.

SUMMARY

A method and apparatus for providing information to a network are disclosed. An eNodeB (eNB) may receive pattern information relating to connection state management behavior of a wireless transmit/receive unit (WTRU). The eNB may receive this information over S1 signaling when a connection is established. The eNB may determine a time factor for connection state management, wherein the time factor may be based on the received information. The determine time factor may be used to adjust connection states of the WTRU.

BRIEF DESCRIPTION OF THE DRAWINGS

A more detailed understanding may be had from the following description, given by way of example in conjunction with the accompanying drawings wherein.

DETAILED DESCRIPTION

Figure 1A:
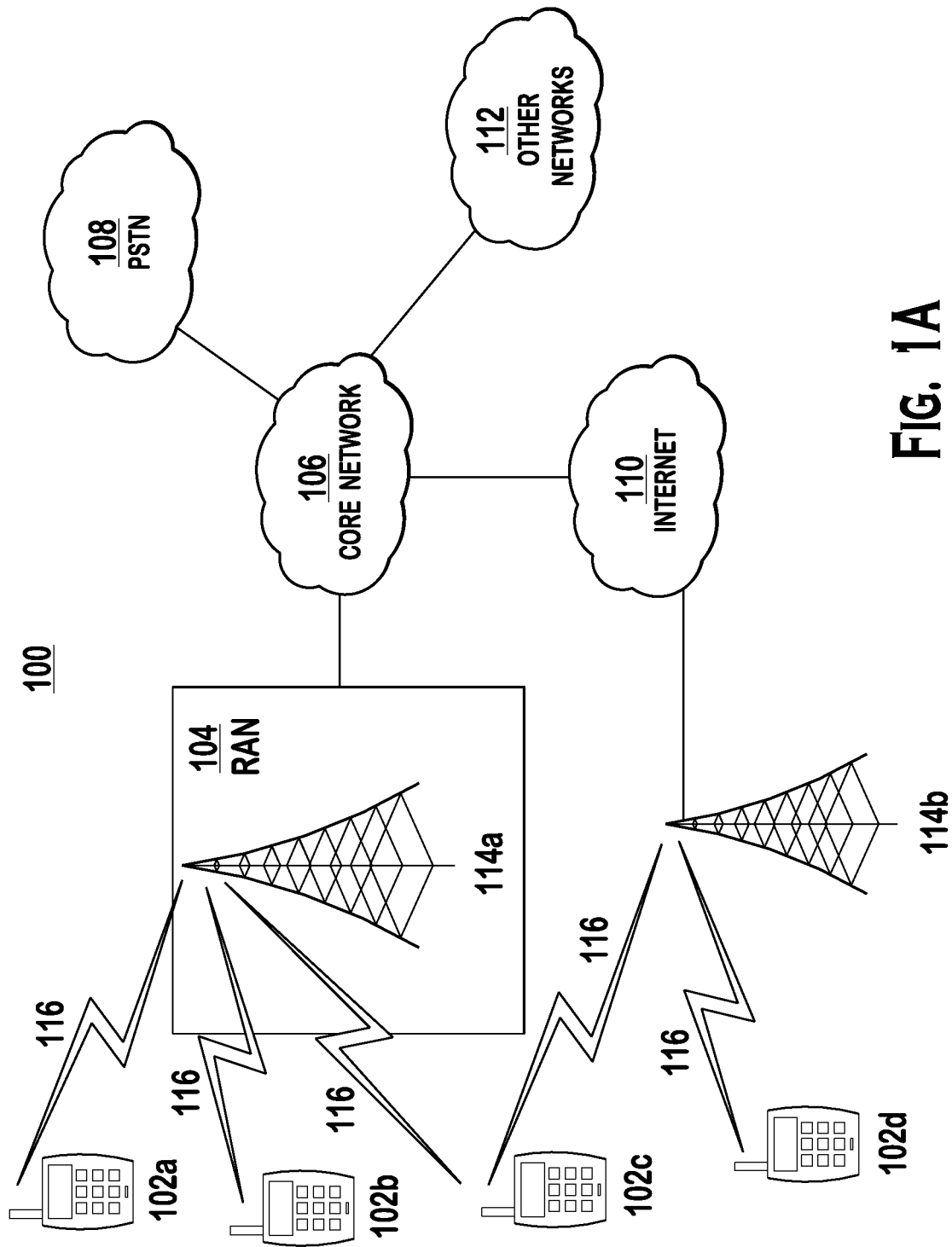
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
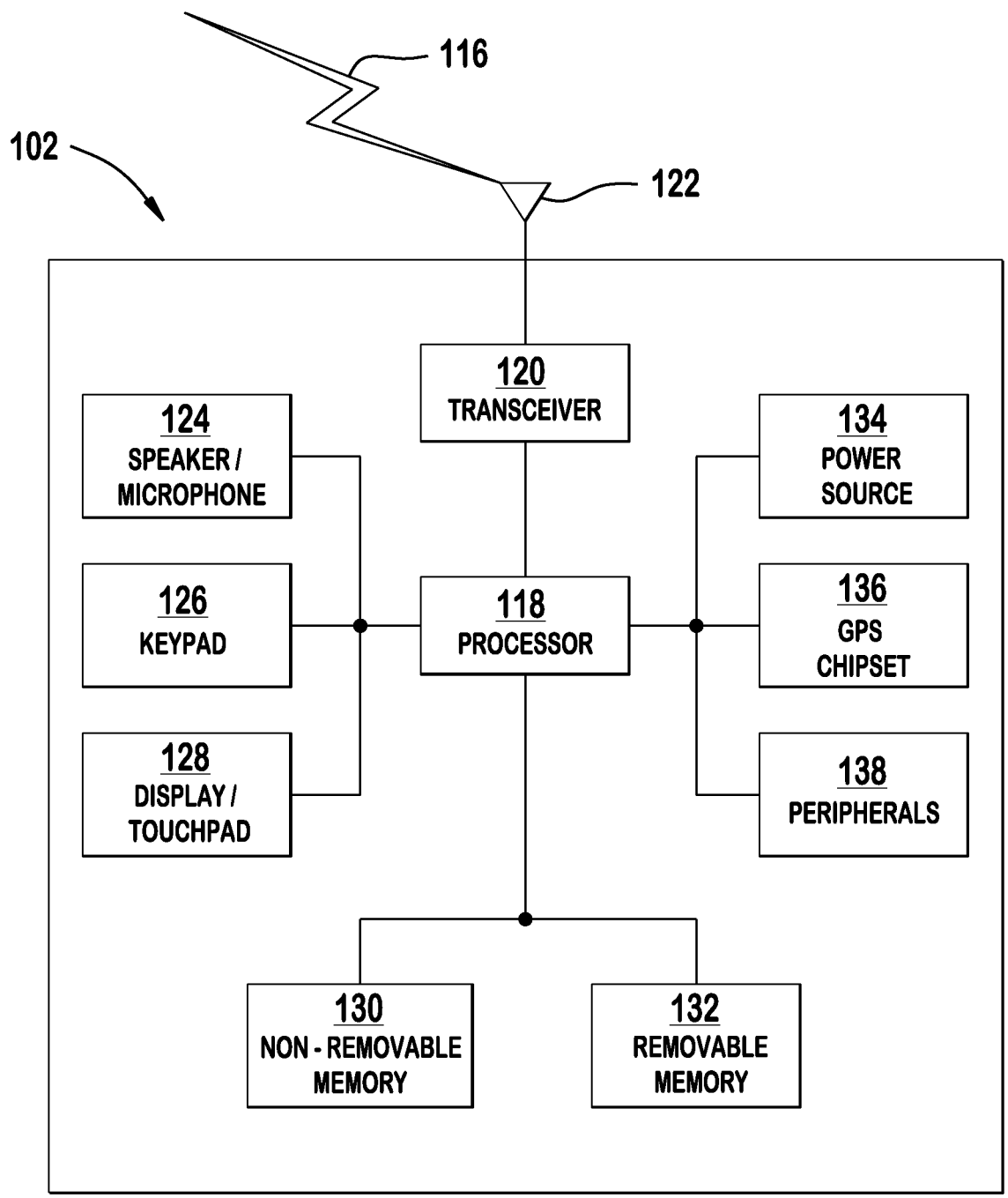
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
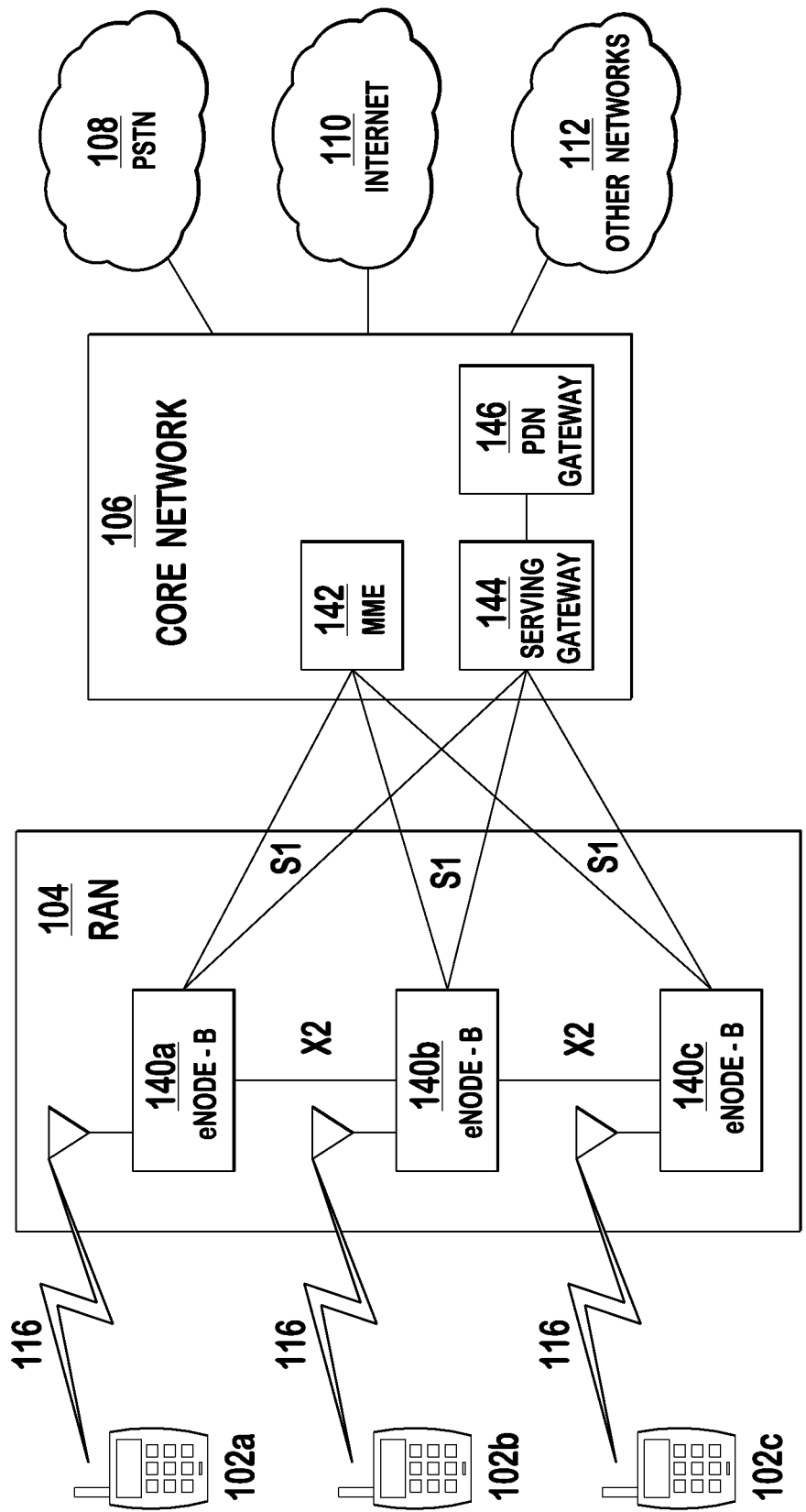
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In LTE, a PDCCH is used by the network to assign PDSCH resources for downlink transmissions and to grant PUSCH resources for uplink transmissions to the WTRU. A WTRU may request radio resources for an uplink transmission by sending a scheduling request (SR) to the eNB. The SR may be transmitted either on dedicated resources on a PUCCH if configured, or using a random access procedure.

A WTRU is granted radio resources by the eNB for a transmission on a PUSCH, indicated in a grant received on the PDCCH or on configured resources (i.e., a semi persistently scheduled (SPS) UL grant).

A WTRU determines whether or not it needs to act on control signaling in a given sub-frame by monitoring the PDCCH for specific downlink control information (DCI) messages scrambled using a known radio network temporary identifier (RNTI) in specific locations, (i.e., a search space), using different combinations of physical resources (i.e., control channel elements (CCEs)) based on aggregation levels (ALs). Each AL corresponds to either 1, 2, 4, or 8 CCEs. A CCE comprises 36 quadrature phase shift keying (QPSK) symbols, or 72 channel coded bits.

The PDCCH is separated in two distinct regions. The set of CCE locations in which a WTRU may find DCIs it needs to act on is referred to as a search space. The search space is split into the common search space and WTRU-specific search space. The common search space is common to all WTRUs monitoring a given PDCCH, while the WTRU-specific search space differs from one WTRU to another. Both search spaces may overlap for a given WTRU in a given sub-frame as this is a function of the randomization function, and this overlap differs from one sub-frame to another.

The set of CCE locations that makes up the common search space and its starting point is a function of the cell identity and the sub-frame number. For LTE R8/9, DCIs may be sent with AL4 (4 CCEs) or AL8 (8 CCEs) in the common search space. For a sub-frame for which the WTRU monitors the PDCCH, the WTRU may attempt to decode 2 DCI format sizes (e.g., DCI formats 1A and 1C, and DCI format 3A used for power control) in up to 4 different sets of 4 CCEs for AL4 (i.e., 8 blind decoding) and up to 2 different sets of 8 CCEs for AL8 (i.e., 4 blind decoding) for a total of at most 12 blind decoding attempts in the common search space.

The common search space corresponds to CCEs 0-15, implying four decoding candidates for AL4 (i.e., CCEs 0-3, 4-7, 8-11, and 12-15) and two decoding candidates for AL8 (i.e., CCEs 0-7, and 8-15).

The set of CCE locations that makes up the WTRU-specific search space and its starting point is a function of the WTRU identity and the sub-frame number. For LTE R8/9, DCIs may be sent with AL1, AL2, AL4, or AL8 in the WTRU-specific search space. For a sub-frame for which the WTRU monitors the PDCCH, the WTRU may attempt to decode 2 DCI formats in up to 6 different CCES for AL1 (i.e., 12 blind decoding), up to 6 different sets of 2 CCEs for AL2 (i.e., 12 blind decoding), up to 2 different sets of 8 CCEs for AL8 (i.e., 4 blind decoding), and up to 2 different sets of 8 CCEs for AL8 (i.e., 4 blind decoding) for a total of at most 32 blind decoding attempts in the WTRU-specific search space.

Depending on the WTRU's connection to the network, capabilities and supported features, the WTRU may monitor one or more RNTIs for grants, assignments, and other control information from the eNB. The WTRU may monitor at least one of a system information RNTI (SI-RNTI), a paging RNTI (P-RNTI), a random access RNTI (RA-RNTI), a multimedia broadcast/multicast services (MBMS) RNTI (M-RNTI), a cell RNTI (C-RNTI), a temporary C-RNTI, a semi-persistent scheduling C-RNTI (SPS-C-RNTI), etc. The SI-RNTI is cell-specific, and is used to indicate scheduling of system information on a PDSCH in the common search space. The P-RNTI may be assigned to multiple WTRUs for decoding of the paging notification (e.g., in IDLE mode) in the common search space. The RA-RNTI is used to indicate scheduling of the random access response on a PDSCH, and identifies which time-frequency resource was used by a WTRU to transmit the random access preamble. The M-RNTI is cell-specific and is used to decode the notification of a change on the MBMS control channel (MCCH) in the common search space. The C-RNTI is a WTRU-specific RNTI used to decode a PDCCH for contention-free grants and assignments, for example, for DCIs in the WTRU-specific search space. The temporary C-RNTI may be used for decoding of messages for the contention-based procedure, and/or before the WTRU gets assigned its own C-RNTI. The SPS-C-RNTI may be used to activate a semi-persistent downlink allocation on a PDSCH or uplink grant on a PUSCH in the WTRU-specific search space. A transmit power control (TPC)-PUSCH-RNTI and a TPC-PUCCH-RNTI may be used for power control of the PUSCH and PUCCH, respectively.

In LTE, the network may configure a WTRU with parameters for discontinuous reception (DRX). DRX is a functionality that allows a WTRU to not monitor and decode the PDCCH, for the purpose of lowering WTRU power consumption. The DRX functionality relies on a specific set of rules based on PDCCH activity for a number of specific RNTIs. These rules ensure that the network and the WTRU are synchronized with respect to when the WTRU may be reached using the control signaling. When DRX is configured, the WTRU may monitor the PDCCH at least when in DRX active time (with the exception of a configured measurement gap).

Within a transceiver (i.e., WTRU), power consumption is distributed between the baseline baseband, the baseband, the receiver and the transmitter. While the baseline baseband consumes little power, each of the three other components corresponds approximately to ⅓ of the total power consumption. The startup times for each also differ, and turning on the baseband component may require more than a few tens of ms, including synchronization with network signals.

From a processing requirement and implementation perspective, given that in a subframe for which the WTRU monitors PDCCH for DL assignments, the symbols containing user data (e.g., PDSCH) follow the symbols used for the L1 control region (e.g., the PDCCH), and the processing of L1 signaling is not instantaneous. A WTRU may buffer at least part of the PDSCH symbols, at least until it can complete the processing of the L1 signaling and can determine whether or not there is a DL transmission addressed to the WTRU on the PDSCH in that subframe. Therefore, the benefit of DRX goes beyond saving some processing for the PDCCH. For subframes in which the WTRU is not required to monitor PDCCH for UL grants and DL assignments, a WTRU may elect to turn off at least parts of its transceiver (Tx/Rx) circuitry, including memory components and/or parts of the baseband component (if the number of subframes for which the WTRU will not monitor PDCCH is sufficiently large, for example, a few 10s of ms). The RNTIs for which the WTRU applies the above include C-RNTI, TPC-PUCCH-RNTI, TPC-PUSCH-RNTI, SPS-C-RNTI, etc.

The idea described herein may additionally be applicable to a DRX function where additional RNTI(s) are considered in later evolutions of the specifications, and is thus not precluded by this document.

In LTE, a WTRU may initiate the random access procedure when the WTRU makes an initial access to the network to establish an RRC connection, when the WTRU accesses the target cell during a handover, when the WTRU performs the RRC connection re-establishment procedure, when the WTRU is instructed by the network to perform the random access procedure (i.e., by PDCCH random access order, for example, for DL data arrival), when the WTRU makes a scheduling request, but has no dedicated resources on a PUCCH for the request, (e.g., when the WTRU has new UL data to transmit that has a higher priority than existing data in its buffer), or the like.

Depending on whether or not the WTRU is assigned dedicated RACH resources (e.g., a specific preamble and/or PRACH resource), the random access procedure may be either contention-free random access (CFRA) or contention-based random access (CBRA). For the random access, a WTRU sends a preamble on a resource of the physical random access channel (PRACH). The WTRU then receives a random access response (RAR). The RAR contains a grant for an uplink transmission and a timing advance command (TAC). For the CBRA, for contention resolution, the WTRU determines whether or not it successfully completed the RACH procedure based on either C-RNTI on a PDCCH or WTRU contention resolution identity on a DL-SCH.

In LTE, a WTRU may be configured, using RRC, with dedicated resources for the transmission of CQI/PMI/RI reports and for scheduling requests (SR). In addition, a WTRU may be configured with dedicated uplink resources for SPS, as well as with an uplink PUCCH resource for HARQ acknowledgement (ACK) for a corresponding DL SPS configuration. The network may assign a WTRU with dedicated SRS resources to assist scheduling decisions in allocation of uplink resources for PUSCH transmissions.

In LTE, in order to maintain the orthogonality among uplink transmissions from a plurality of WTRUs, the uplink transmissions from different WTRUs to the eNB within the same subframe should be approximately time-aligned, where the margin of error should be within the cyclic prefix length. The cyclic prefix is a guard interval in the time domain that is added to each symbol to handle channel delay spreading. For LTE, the generic frame structure with normal cyclic prefix length contains 7 symbols, and the cyclic prefix length is 5.2 µs for the first symbol and 4.7 µs for the other symbols of the frame. For larger cells, an extended prefix may be configured. The timing advance is a negative offset at the mobile terminal between the start of a received downlink subframe and a transmitted uplink subframe (i.e., the subframe for the uplink transmission starts ahead of the downlink subframe at the mobile terminal). The offset may be adjusted by the network using timing advance command (TAC) signaling, and such adjustments are based on previous uplink transmissions by the WTRU, including sounding signals (SRS) and any other uplink transmissions.

In LTE, before a WTRU can perform uplink transmissions for periodic SRS or an uplink transmission on either a PUCCH or a PUSCH, the WTRU needs to have proper timing alignment with the network. Uplink synchronization is initially achieved using the RACH procedure, and the network subsequently transmits a TAC in the downlink to maintain proper timing alignment. A WTRU (re)starts the timing advance timer (TAT) upon receipt of the TAC. A TAC may be received in the RAR during the RA procedure or in a Timing Advance MAC Control Element (CE).

When the TAT is running, the WTRU may transmit on a PUCCH resource in a subframe for which the WTRU does not perform a PUSCH transmission (single carrier property). PUCCH resources are dynamically allocated for HARQ ACK feedback for a PDSCH transmission in a frequency/time shared resource of the PUCCH region. The WTRU determines which PUCCH resource to use based on the first CCE of the DCI received on a PDCCH which indicated the PDSCH assignment.

The TAT may expire for a synchronized WTRU when it does not receive a TAC from the network for at least period equal to the configured value of the TAT (i.e., the timeAlignmentTimer, which ranges from 500 ms up to 10,240 ms, if enabled). A WTRU may not receive a TAC in case all TACs are lost during that period. Alternatively, a WTRU may not receive a TAC if the network does not send any, for the purpose of implicitly releasing dedicated uplink resources when the network no longer schedules the WTRU for new transmissions. The validity of the WTRU's timing advance is controlled by the eNB.

When the TAT expires, the WTRU releases its dedicated uplink resources, i.e., any configured SRS resources as well as PUCCH resources for SR and CQI/PMI/RI, and any configured downlink and uplink SPS resources. Additionally, the WTRU may not be allowed to perform any PUCCH or PUSCH transmission once it is not considered synchronized with the network. This is to avoid possible interference to the transmission of other WTRUs. In addition, it provides implicit means for the scheduler to revoke dedicated uplink resources, simply by having the TAT expiring following the absence of TACs from the network.

Signaling radio bearers (SRBs) are radio bearers used for the transmission of RRC and NAS messages. SRB0 is used for RRC messages using a common control channel (CCCH), SRB1 is for RRC messages (with a piggybacked NAS message as well) and for NAS messages prior to establishment of SRB2 using a dedicated control channel (DCCH). SRB2 is for NAS messages and is configured after activation of security. Once security is activated, all RRC messages on SRB1 and SRB2 are integrity protected and ciphered. Data radio bearers (DRBs) are radio bearers used for the transmission of user plane data (e.g., IP packets).

One way to improve the user plane latency for synchronized WTRUs (i.e., WTRUs that have a valid timing alignment) but do not have a valid UL grant, is to use a contention-based (CB) method. The network may advertise (otherwise unused) uplink resources on a PDCCH to one or more WTRUs connected to the network. A special RNTI, (i.e., contention-based" RNTI (CB-RNTI)), may be assigned to the WTRU(s) for this purpose, for example, during the radio configuration of the WTRU, and the same CB-RNTI may be signaled to multiple WTRUs.

The non-access stratum (NAS) protocol runs between a WTRU and a mobility management entity (MME) in the core network. The NAS is responsible for (among other things) performing a public land mobile network (PLMN) selection, registration (via attach or tracking area update procedure) to the network (i.e., the selected PLMN), requisition of IP address(es) and thereby bearers for user plane operation, and transition from idle to connected mode.

When a WTRU powers on, it starts in EPS mobility management (EMM)-DEREGISTERED state (as it is not yet registered to the network). After a PLMN/cell has been chosen, the WTRU/NAS attempts to register to the network, thereby requesting an RRC connection to transmit the first NAS message (i.e., the attach message).

After the first NAS message is transmitted (when in RRC connected state) and the first NAS response is received, the NAS is then said to be in EMM-Connected mode. An RRC connection is needed for an NAS connection to be established (i.e., for the WTRU to be in EMM-Connected mode).

When the WTRU is in an idle mode, both the WTRU and the MME maintain the WTRU's active EPS bearer context such that resources for these active bearers will be setup upon transition to a connected mode. In LTE, the WTRU may have at least a default bearer active, and while in a connected mode, corresponding resource (on the radio and S1-U) for at least this bearer may be setup.

The NAS service request procedure is used to bring a WTRU from idle to connected mode. When this transition occurs, the network will setup resources (DRBs and S1-U) for active EPS bearer context that is retained at the MME.

When the WTRU goes from idle to connected mode, all or a subset of the dedicated bearers may not have resources (DRBs) setup, and the WTRU RRC informs the NAS about those that were deactivated (DRBs not setup) and thus the NAS deactivates the corresponding EPS bearers. However, the WTRU remains in the system and operates with the default bearer (but is allowed to request dedicated bearers if need be). The WTRU's RRC informs the NAS about the bearers that do not have any resources setup. If the default bearer is one of them, the NAS performs a local detach and the WTRU needs to re-attach to the system for operation.

The NAS service request procedure is initiated in idle mode (with the exception of circuit switched (CS) fallback). A WTRU that is already in a connected mode (RRC and EMM) may not send an NAS service request message (except for CS fallback). The NAS service request procedure is deemed successful by the WTRU, (i.e., NAS), upon lower layer indication that the DRBs have been setup, or upon the reception of an NAS service reject message from the MME.

In LTE, a service that generates user plane data may be associated with a radio access bearer (RAB). A WTRU may be configured with one or more RABs, and different RAB may terminate in different PDN gateway (PGW) in the core network.

An RAB may be associated to a DRB. An RAB may be associated with a specific set of QoS characteristics. The network configures a DRB (e.g., with parameters such as logical channel priority, prioritized bit rate (PBR), and packet data convergence protocol (PDCP) service data unit (SDU) discard timer, etc.) according to the desired level of QoS.

A DRB may be associated to either a default EPS bearer, or to a dedicated bearer. Applications use bearers (both default and dedicated) according to the given QoS supported by those bearers. Packet filters may be used in the WTRU (e.g., for uplink data) and in the CN (e.g., for downlink data) to determine how to associate an IP packet with a given RAB.

In LTE, a service may generate user plane data that require different QoS levels. For example, a voice over IP (VoIP) application may generate an RTP voice/audio stream using a given UDP port, and exchange RTCP control packets using a different UDP port. In this case, the RTP flow may use a first RAB, while the RTCP flow may use a second RAB. The WTRU thus determines for each generated IP packet what RAB the packet should be transmitted on. It may be realized using packet filters or traffic flow template (TFTs). The WTRU may be configured with packet filters or TFTs by the network.

Figure 2:
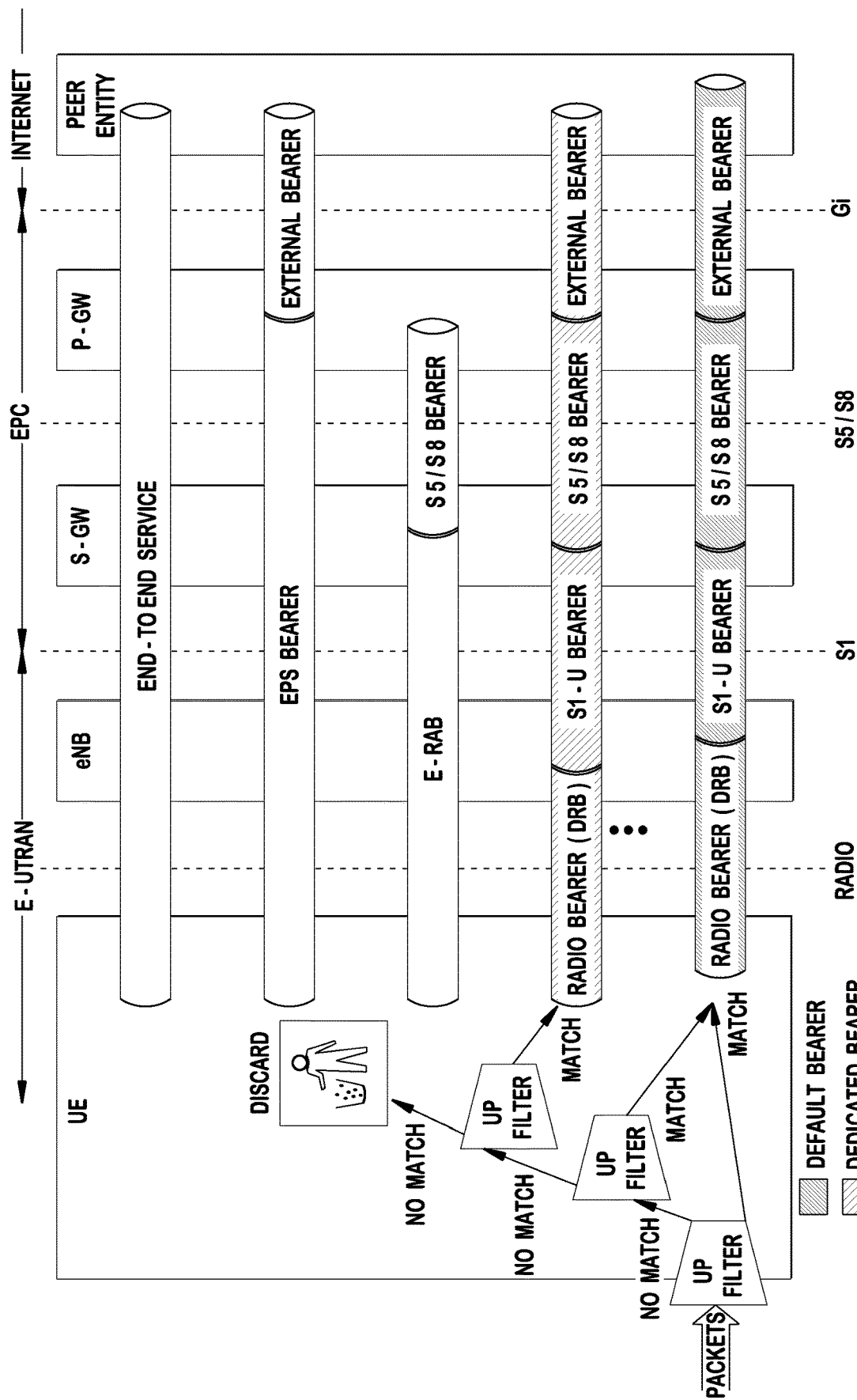
FIG. 2 shows an example bearer service architecture wherein packet filters are used to direct packets to the relevant radio bearer.

FIG. 2 shows an example bearer service architecture wherein packet filters are used to direct packets to the relevant radio bearer. In this example, packets are either sent to one of the available dedicated bearers or the default bearer, or they may be discarded if they do not match the flow characteristics as defined by the relevant TFT. TFTs are provided by the network (e.g., PGW) when a CreateSessionResponse message is sent in response to CreateSessionRequest message. The message may be sent, for example, when a SGW changes, e.g., during handover, or when the WTRU requests PDN connectivity either during an attach procedure or a PDN connectivity request procedure.

In LTE, one or more EPS bearer(s) may be setup or removed for a WTRU given using higher layer procedures. The WTRU may maintain any default EPS bearer(s) and any other associated dedicated bearer(s) in the WTRU's context as long as the WTRU is attached to the network. In particular, EPS bearers are maintained in the WTRU's context independently of the state of the RRC connection, (i.e., even when in idle mode). EPS bearers are removed when the WTRU performs the detach procedure from the network.

In LTE, when the WTRU releases the RRC connection, any radio access bearers (SRBs, DRBs) may be released (e.g., the S1u connection and associated context between the eNB and the SGW is released).

In the connection-less transmission, small data packets may be carried over by the control plane, following a signaling RRC connection establishment message. This type of data transmission may be viewed as a connectionless approach for packet transfer in a cellular network because the message is conveyed without setting up a user plane connection. The end-user packet may be sent along with a large header that enables subsequent processing of the packet by the receiving node (e.g., the end-user packet is embedded within an NAS/AS control plane message).

A WTRU may send data in any NAS message, for example, by adding an information element (IE) that may carry the data part. The IE may be added, for example, to the attach request message, the service request message, the PDN connectivity request (in the LTE case) message, a tracking area update (TAU) request message, or the like. If the PDN connectivity request message is included in the attach message, the WTRU may indicate, (e.g., by using a specific value given to the EPS bearer identity), that no EPS bearer/PDP context may be set up. In addition, the small data may be carried in a container within the Protocol Configuration Options IE. Similarly methods may be used to transmit data in the downlink direction.

A new IE "Mtc-datagram-info" may be included in an NAS message (e.g., a MM message or EMM message, etc.) for the purpose of carrying small volume of data for machine-type communication (MTC) devices or other applications to enhance the capability of the original NAS message for completing both the administrative and the data transfer function in one. This IE may contain the destination address, routing information, small data type, end-of-chain parameter indicating whether this is the last unit in a chain of small data transfer units to one destination, security information, or the like.

A WTRU may be configured in numerous different manners, such that tradeoffs may be achieved between data transfer latency, power consumption, control signaling overhead, and network efficiency. For example, a WTRU may be in RRC_CONNECTED for a long period of time for the benefit of low control signaling overhead and low data transfer latency, but at the expense of battery usage and network resource efficiency when dedicated resources remains committed. Conversely, a WTRU may instead periodically transit between RRC_CONNECTED and RRC_IDLE states for the benefit of low power consumption, but at the cost of increased data transfer latency and additional control signaling overhead.

WTRUs may support a wide variety of applications, often in parallel, each with different traffic characteristics and requirements. Many such applications are agnostic to the technology used for transmission of their data, and some applications may not be very well suited for wireless transmissions. For example, in case an application generating data traffic with relatively long periods of low-volume at intermittent intervals, a WTRU may be idle for a long period while it may still regularly connect to the network to exchange small amounts of data.

In case such applications remain active over a long period of time, background traffic may be generated at regular intervals. Embodiments are disclosed herein for the methods such that a WTRU may remain ready for transmitting small amounts of data, while maximizing usage of battery and network resources.

A WTRU implementing the embodiments disclosed herein are referred to as "dormant WTRU," "WTRU in dormant mode," or "WTRU using a dormant behavior," which will be used interchangeably. The WTRU in a dormant mode may be realized by using a new RRC state (e.g., RRC_DORMANT). Alternatively, the dormant mode may be realized using additional procedures in the RRC idle state, (i.e., defining a sub-state with modifications to the conventional RRC_IDLE state), or using additional procedures in the RRC connected state (i.e., defining a sub-state with modification to the conventional RRC_CONNECTED state). Alternatively, the dormant mode may be realized using additional power savings methods. Such procedures and methods may include using a second set of configuration parameters applicable to the applicable behavior. The terms "dormant mode", "RRC_DORMANT" and "RRC_DORMANT state" will be used to refer to the behavior or state of the WTRU or network entity in accordance with any one of these realizations.

Figure 3:
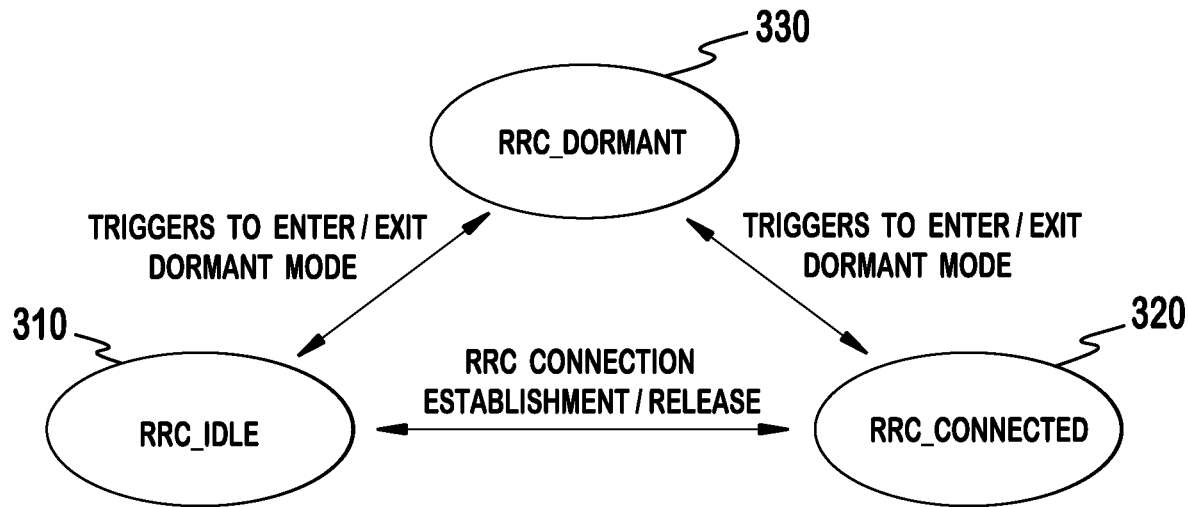
FIG. 3 shows state transitions among RRC_IDLE, RRC_CONNECTED, and RRC_DORMANT in accordance with one embodiment.

FIG. 3 shows state transitions among RRC_IDLE 310, RRC_CONNECTED 320, and RRC_DORMANT 330 (i.e., a new RRC state) in accordance with one embodiment. It should be noted that FIG. 3 shows the case that uses the new RRC state as an example realization of the dormant mode, and the dormant mode may be realized by defining a sub-state of the RRC_IDLE 310 or RRC_CONNECTED 320 as stated above. The WTRU may transition among the RRC states based on predetermined implicit or explicit triggers, which will be explained in detail below.

A WTRU is in RRC_CONNECTED 320 when an RRC connection has been established. If no RRC connection is established, the WTRU is in RRC_IDLE state 310. In the RRC_IDLE state 310, a WTRU may be configured with a WTRU-specific DRX, and performs WTRU-controlled mobility. The WTRU monitors a paging channel to detect incoming calls, system information change, etc. The WTRU performs neighboring cell measurements and cell re-selection, acquires system information, and performs logging of available measurements.

In the RRC_CONNECTED state 320, a WTRU may transmit and/or receive unicast data. At lower layers, the WTRU may be configured with a WTRU-specific DRX. A network controlled mobility, (i.e. handover) is performed in the RRC_CONNECTED state 320. The WTRU monitors a paging channel and/or system information block type 1 contents to detect system information change. The WTRU monitors control channels associated with the shared data channel to determine if data is scheduled for it, provides channel quality and feedback information, performs neighboring cell measurements and measurement reporting, and the like.

In the RRC_DORMANT state 330, a WTRU, unlike RRC_IDLE 310, may send a scheduling request using a dedicated PRACH, and may transmit and receive unicast data using dedicated resources (e.g., using C-RNTI). In the RRC_DORMANT state 330, the WTRU, unlike RRC_CONNECTED 320, may perform WTRU-controlled mobility (e.g., WTRU-autonomous cell selection and reselection), and scheduling occasions for the WTRU may be adjusted to match paging cycle.

A WTRU may be requested by the network (using an L3 message) to move to the RRC_DORMANT state 330 (e.g., to allow network-controlled WTRU transitions to a power saving state). The WTRU may be configured with, or may autonomously derive, one or more DRX configurations, either for L3 DRX operation or L2 DRX operation. An additional L3 DRX may be configured in RRC_DORMANT 330 which has precedence over an L2 DRX (e.g., to avoid excessive radio link measurement requirements). The WTRU may maintain at least a part of its PUCCH configuration (e.g., configuration for CQI reporting) and/or dedicated SRS configuration even when unsynchronized (e.g., to avoid the need of RRC reconfiguration for every unicast data transfers). The WTRU may use cell reselection during periods for which it is not scheduled actively by the network for unicast transfers, while it may use measurement reporting configuration otherwise. Cell re-selection may trigger a transition to the RRC_IDLE state 310 and may trigger an initial access in the target cell.

In the RRC_DORMANT state 330, the WTRU may use a contention-based grant to transmit uplink data (e.g., to avoid latency of the scheduling request). The WTRU may perform an uplink transmission, regardless of the uplink timing synchronization, in a special subframe to avoid maintaining timing alignment, which will be explained in detail below. Alternatively, the WTRU may perform a contention-free random access (CFRA) transmission in a WTRU-specific subframe to request uplink resources for an uplink transfer that corresponds to the dormant mode, to gain uplink timing synchronization, and/or to acknowledge downlink transmission(s).

Upon transition to a dormant mode, the RRC may inform upper layers (e.g., NAS) of such transition. For example, the RRC may indicate to the NAS that a dormant mode is activated (e.g., upon a transition to the RRC_DORMANT state 330). When the NAS receives such indication, it may initiate session management signaling e.g., to install packet filters (in traffic flow templates (TFTs)), such that the WTRU may determine what packets from what DRB may be transmitted using what dormant mode radio bearer (XRB) of the WTRU's configuration. An XRB is conceptually represented as a radio bearer that is configured for user plane data in a dormant mode for a specific type of traffic (e.g., low priority, intermittent, background data services).

In another embodiment, the dormant behavior may be realized by modifying the idle mode procedures (e.g., in RRC_IDLE state 310). In the modified RRC_IDLE state (e.g., in a sub-state of the RRC_IDLE state 310), the WTRU may monitor a PDCCH for paging messages at its WTRU-specific paging occasions. The WTRU may request and/or indicate to the network using an L3 message that it moves to RRC_IDLE (e.g., to allow autonomous WTRU transitions to a power saving state). The WTRU may be requested by the network using an L3 message that it needs to move to RRC_IDLE (e.g., to allow network-controlled WTRU transitions to a power saving state). The WTRU may maintain at least part of the configuration applicable to the RRC CONNECTED state 320 in the modified RRC_IDLE state (e.g., in a sub-state of the RRC_IDLE state 310). The WTRU may maintain at least its security context upon transition to RRC_IDLE (e.g., to avoid the need to re-activate security for the next unicast data transfer). The WTRU may maintain at least its C-RNTI upon transition to RRC_IDLE (e.g., to avoid the need to re-assign a C-RNTI using the random access procedure for the next unicast data transfer). The WTRU may maintain at least part of its PUCCH configuration (e.g., for CQI reporting or for D-SR) and/or dedicated SRS configuration upon transition to RRC_IDLE and even if unsynchronized (e.g., to avoid the need of an RRC reconfiguration for the next unicast data transfers). Cell re-selection may invalidate the configuration applicable to the RRC_CONNECTED state and to the dormant mode such as the security context and dedicated configuration (e.g., PUCCH configuration), and complete the transition to the RRC_IDLE state. A timer-based mechanism may be used to invalidate the security context and the dedicated configuration (e.g., PUCCH configuration) and to complete the transition to the RRC_IDLE state (e.g., if no unicast data transfer occurs during a period of time, such as since last transfer).

In another embodiment, the dormant mode may be realized by modifying the connected mode procedures (e.g., in RRC_CONNECTED state). In the modified RRC_CONNECTED state (e.g., in a sub-state of the RRC_CONNECTED state), the WTRU may be configured with, or may autonomously derive, one or more DRX configurations, either for L3 DRX operation or L2 DRX operation. The WTRU may be configured with L2 DRX for power savings and scheduling occasions, and an additional L3 DRX may be configured which has precedence over the L2 DRX (e.g., to avoid excessive radio link measurement requirements). The WTRU may maintain at least part of its PUCCH configuration (e.g., for CQI reporting or for D-SR) and/or dedicated SRS configuration even when unsynchronized (e.g., to avoid the need of an RRC reconfiguration for every unicast data transfers).

A new NAS state may be defined to reflect entering or exiting a dormant mode. As an example, the state may be referred to as a dormant mode and may be realized as either a subset of EMM-IDLE or EMM-CONNECTED mode. The term "EMM-DORMANT" will be used hereafter and this may refer to an NAS dormant mode that may either be a sub-state of EMM-IDLE (e.g., EMM-IDLE.DORMANT) or a sub-state of EMM-CONNECTED (e.g., EMM-CONNECTED.DORMANT). This dormant state may be realized as a sub-state of EMM-REGISTERED state or EMM-REGISTERED.NORMAL-SERVICE state.

Figure 4:
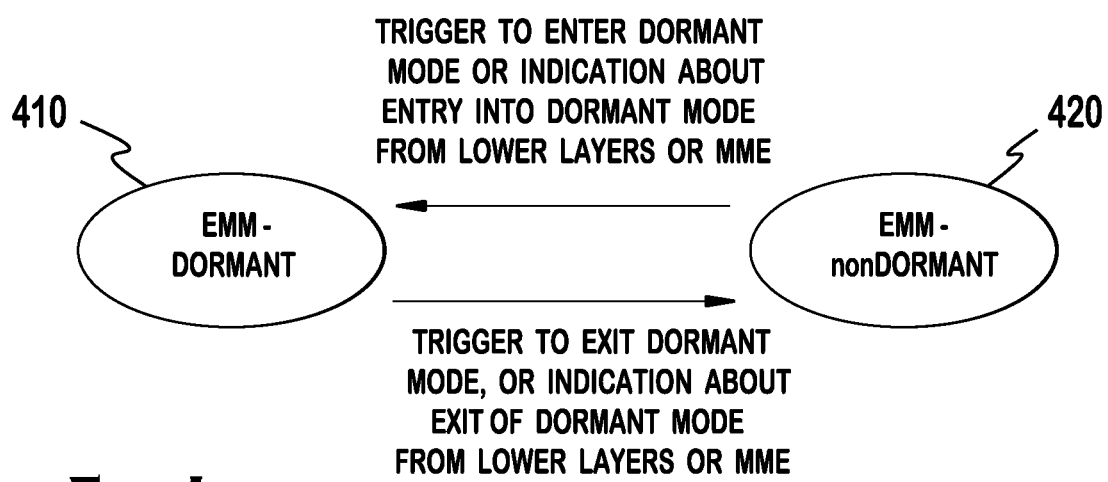
FIG. 4 shows a diagram of example state transitions at the non-access stratum (NAS)

FIG. 4 shows a diagram of example state transitions at the NAS. EMM-DORMANT 410 defines a WTRU NAS behavior in a dormant mode that may be realized as a sub-state of EMM-IDLE, EMM-CONNECTED, or EMM-REGISTERED, etc. The state EMM-nonDORMANT 420 indicates that the WTRU is not operating in a dormant mode and may be in EMM-IDLE, EMM-CONNECTED, or EMM-REGISTERED, etc. The NAS transitions between EMM-DORMANT 410 and EMM-nonDORMANT based on a trigger or an indication from a lower layer or an MME.

It should be noted that while the embodiments will be described with reference to 3GPP LTE, the embodiments are applicable to any wireless systems including, but not limited to, WCDMA, HSUPA, HSDPA, HSPA+, GERAN, IEEE 802.xx, and the like.

Embodiments for enabling and disabling a dormant mode are disclosed hereafter. Whether or not the WTRU may use a dormant mode of operation may be controlled using one or a combination of any of the following embodiments.

A WTRU in a connected mode may implicitly determine that it may enable a dormant mode of operation using at a least one of the following embodiments.

A WTRU may transit to a dormant mode on a condition that the NAS of the WTRU transits to a dormant mode (e.g., EMM_DORMANT) and indicates it to the RRC. The WTRU may transit to a dormant mode (e.g., RRC_DORMANT or RRC_IDLE or RRC_CONNECTED state that supports a dormant mode of operation) on a condition that the NAS of the WTRU transmits control signaling (e.g., a NAS service request or a NAS service update) that requests setup for resources for the dormant mode operation, (for example, one or more EPS RAB(s) that maps to XRB(s)). Alternatively, the WTRU may transit to a dormant mode on a condition that the NAS of the WTRU receives control signaling that sets up resources for the dormant mode operation, (e.g., one or more EPS RAB(s) that maps to XRB(s)).

Alternatively, the WTRU may transit from a connected mode (e.g., RRC CONNECTED) to a dormant mode (e.g., RRC_DORMANT or RRC_IDLE or RRC_CONNECTED state that supports a dormant mode of operation). For example, the WTRU may transit to the dormant mode on a condition of reception of RRC control signaling, or any control signaling (such as L2 MAC signaling) that activates the use of the dormant behavior for the WTRU.

Alternatively, a WTRU may autonomously indicate and/or request a release of the RRC connection (e.g., by sending an RRC connection release request message). The WTRU may include additional information in the request, including traffic characteristics such as at least one of average inter-packet arrival time with or without mean deviation, average inter-burst arrival time with or without mean deviation, average burst size, buffer fill rate, average packet size, or the like as described herein. The WTRU may include information related to the WTRU's mobility. The WTRU may include a selection of preferred parameters such as DRX parameters and/or scheduling request parameters, such as an index corresponding to parameters selected from a list of available parameters. The WTRU may autonomously enable the dormant mode as part of the RRC connection release request. Alternatively, the WTRU may be instructed in a message in response to the RRC connection release request to enable the dormant mode. The response message may include a configuration or a reconfiguration of the WTRU's parameters to be used while operating with the dormant mode.

Alternatively, the WTRU may enable a dormant mode on a condition that the WTRU has not received any control signaling (e.g., for scheduling of dedicated transmissions) for a consecutive number (which may be configurable) of DRX cycles, or on a condition that the WTRU receives a MAC DRX control element (CE) indicating that a different (e.g. possibly longer) DRX cycle may be used. The WTRU may receive signaling (e.g. a MAC CE) that indicates an index to a DRX configuration from a list of available DRX configurations. For example, the indication may correspond to a different (e.g., non-default) configuration for other configuration aspects such as a RACH configuration and/or a PUCCH configuration (e.g., for D-SR).

Alternatively, the WTRU may enable a dormant mode on a condition that the WTRU has not been scheduled for a certain period of time and/or the PDCCH activity is below a certain threshold (which may be configurable).

Alternatively, the WTRU may enable a dormant mode based on a timer, (e.g., a certain number of subframe(s) have elapsed). The timer may, for example, be restarted based on the WTRU's scheduling activity. For example, the timer may be restarted on a condition that the WTRU successfully decodes PDCCH control signaling (e.g., scrambled with the C-RNTI). Alternatively, the timer may correspond to the number of DRX cycles (if configured) without receiving any control signaling. Alternatively, the timer may be restarted based on the WTRU's buffer status. For example, the timer may be restarted on a condition that the uplink buffer of the WTRU is empty. This may be applied to the buffer status for a subset of the configured logical channel groups (LCGs) and/or logical channels (LCHs) and some data, (e.g., data for one or more LCH(s) that correspond to a specific QoS/service) may be excluded. Alternatively, the timer may be restarted based on the WTRU's timing alignment timer (TAT), (e.g., upon expiry of the TAT).

Alternatively, the WTRU may enable a dormant mode on a condition that it no longer has valid uplink timing alignment (e.g., the TAT expires at least for the primary serving cell of the WTRU).

Alternatively, the WTRU may enable a dormant mode on a condition that the WTRU RRC is reconfigured including at least one XRB as part of the WTRU's configuration.

Alternatively, the WTRU may enable a dormant mode on a condition that a WTRU has no data available for transmission. For example, the WTRU may enable a dormant mode on a condition that the WTRU indicates empty buffers in a PUSCH transmission, for example, by including a padding buffer status report (BSR) that reports zero data either for all configured DRBs or for DRBs that are not configured as an XRB. Alternatively, the WTRU may enable a dormant mode after a predetermined amount of time, for example, from the subframe in which the BSR was included in a transmission, or from the subframe in which the WTRU received a HARQ ACK for the transmission. Alternatively, the WTRU may enable a dormant mode on a condition that the WTRU determines that the data arrival rate for at least one DRB (e.g., XRB(s) and when other DRBs have empty buffers during that time) is below a certain threshold (which may be configurable). Alternatively, the WTRU may enable a dormant mode on a condition that the WTRU determines that the inter-packet arrival rate for one or more specific DRB(s) (e.g., XRB(s) and when other DRBs have empty buffers during that time) is above a certain threshold (which may be configurable). Alternatively, the WTRU may enable a dormant mode on a condition that a total sum of data is below a certain threshold.

Alternatively, the WTRU may enable a dormant mode on a condition that the time elapsed between uplink and/or downlink transmissions (i.e., inter-packet or inter-burst arrival time) exceeds a certain threshold (which may be configurable). The WTRU may perform such measurements for one or more subset of the configured DRBs. For example, the WTRU may keep track of inter-packet or inter-burst arrival time for a set of DRBs configured as XRBs, if the WTRU has no data for DRBs that are not configured as XRBs and/or if such DRBs have been inactive for a certain period of time. The WTRU may maintain an average time estimate. The WTRU may maintain a mean deviation estimate. The WTRU's time estimates may be reset on a condition that transmissions for a signaling radio bearer (SRB) are performed, or transmissions for any RB that is not configured as an XRB is performed.

Alternatively, the WTRU may enable a dormant mode on a condition that the buffer fill rate for uplink and/or downlink transmissions is below a certain threshold (which may be configurable) over a certain period of time. The WTRU performs such measurements for one or more subset of the configured DRBs. For example, the WTRU may keep track of the buffer fill rate for a set of DRBs configured as XRBs, if the WTRU has no data for DRBs that are not configured as an XRB and/or if such DRBs have been inactive for a certain period of time. The WTRU's buffer fill rate estimates may be reset on a condition that transmissions for SRBs are performed, or transmissions for any RB that is not configured as an XRB is performed.

A WTRU may implicitly determine that it may disable a dormant mode of operation using at a least one of the following embodiments.

The WTRU may transit away from the dormant mode on a condition that the NAS of the WTRU transits away from a dormant mode and indicates it to the RRC. The WTRU may transit away from the dormant mode on a condition that the NAS of the WTRU transmits control signaling (e.g., an NAS service request or an NAS service update) that requests setup for resources for at least one dedicated and/or default bearer (e.g., that is not associated to an XRB), or on a condition that there is a pending NAS session management procedure. The WTRU may transit away from the dormant mode on a condition that the NAS of the WTRU receives control signaling that sets up resources for at least one dedicated and/or default bearer (e.g., that is not associated to an XRB), or on a condition that there is a pending NAS session management procedure.

The WTRU may transit from the dormant mode (e.g., RRC_DORMANT state) or from a sub-state of an idle or connected mode that supports a dormant mode of operation to a connected mode (e.g. RRC CONNECTED state), upon reception of RRC control signaling. For example, a WTRU may disable the dormant mode on a condition that upper layers (e.g., NAS) request a transition to a connected mode (e.g., RRC CONNECTED state) without dormancy behavior. The WTRU may use an RRC signaling procedure to transit to a connected mode. For example, the WTRU may perform an RRC connection request procedure such that it may disable the dormant behavior and/or transit to an RRC connected state.

Alternatively, the WTRU may disable the dormant mode on a condition that upper layers (e.g., NAS) request a transition to an idle mode (e.g., IDLE state without dormancy behavior). Alternatively, the WTRU may disable the dormant mode on a condition that the WTRU determines that it should perform an RRC state transition to an idle mode (e.g., IDLE state without dormancy behavior), for example, upon detection of a UL or DL radio link failure.

A WTRU may disable a dormant mode on a condition that the WTRU has received control signaling (e.g., for scheduling of dedicated transmissions) for a consecutive number (which may be configurable) of DRX cycles, or the WTRU receives a MAC DRX CE indicating that a different (e.g. possibly shorter) DRX cycle may be used. The WTRU may receive signaling (e.g., a MAC CE) that indicates an index to a DRX configuration from a list of available DRX configurations. Alternatively, the WTRU may revert back to a default DRX configuration. For example, the WTRU may revert back to a default configuration for other configuration aspects such as a RACH configuration and/or a PUCCH configuration (e.g., for D-SR).

A WTRU may disable a dormant mode on a condition that the WTRU has been scheduled during a specific set of subframes and/or for a period longer than a certain number of subframes, or the WTRU determines that the PDCCH activity is above a certain threshold (which may be configurable).

A WTRU may disable a dormant mode based on a timer. For example, the WTRU may disable a dormant mode on a condition that a certain number of subframe(s) have elapsed. The timer may be restarted based on the WTRU's buffer state. For example, the timer may be restarted on a condition that the uplink buffer of the WTRU are non-zero, for example, for a subset of the WTRU's configured LCGs and/or LCHs. The WTRU may determine that buffer levels are above the available uplink resources for a certain amount of time which may lead to disabling dormancy such that more resources may be requested.

The WTRU may disable a dormant mode on a condition that it receives a TAC and has valid uplink timing alignment (e.g., if the TAT is started at least for the primary serving cell of the WTRU's configuration), for example, following a transmission on a PRACH or on a contention-based resource.

The WTRU may disable a dormant mode on a condition that an RRC reconfiguration procedure is performed that adds to the WTRU's configuration at least one DRB which is not an XRB.

The WTRU may disable a dormant mode on a condition that the WTRU has new data available for transmission. For example, the WTRU may disable a dormant mode on a condition that the WTRU determine that data which may benefit from a connected mode behavior becomes available for transmission (e.g., a radio bearer (i.e., a DRB and/or a SRB) that is not configured as an XRB needs to be set up, or data for an existing DRB and/or SRB that is not an XRB becomes available for transmission).

The WTRU may disable a dormant mode on a condition that data becomes available for transmission on an SRB and/or any DRB that is not configured as an XRB. The WTRU may disable a dormant mode on a condition that a scheduling request (SR) is triggered (or pending) or a BSR has been triggered thereof. The WTRU may disable a dormant mode on a condition that an SR is triggered and/or is pending for an SRB, that an SR is triggered and/or is pending for a DRB that is not configured as an XRB, that an SR is triggered and/or is pending for an RB associated with an LCH/LCG with a higher priority than a threshold, and/or that a higher layer (e.g., NAS) initiates the setup of a new service which requires a transition to a connected mode (e.g., RRC_CONNECTED state without dormancy behavior). The WTRU may then initiate an RRC connection request procedure.

Alternatively, the WTRU may disable a dormant mode on a condition that the data arrival rate for at least a subset of DRBs is above a certain threshold (which may be configurable), the inter-packet arrival rate for a specific DRB (e.g., for XRB(s) and when other DRBs have empty buffers during that time) is below a certain threshold (which may be configurable), or the total sum of data is above a certain threshold.

The WTRU may disable a dormant mode on a condition that a configured measurement event triggers a measurement report, for example, for a measurement event of a specific type (e.g., serving cell below a threshold or explicitly indicated in the measurement configuration).

The WTRU may disable a dormant mode on a condition that the WTRU receives an RRC connection reconfiguration message with the mobility control IE not indicating that the WTRU needs to remain in a dormant mode, or if the handover is for a different radio access technology (RAT) or to a different public land mobile network (PLMN), or if a failure to perform a handover occurs while trying to continue in a dormant state.

The WTRU may disable a dormant mode on a condition that the cell reselection procedure results in selection of a cell different than the cell that the WTRU is currently connected to, or is camping on.

The WTRU may disable a dormant mode on a condition that the WTRU experiences radio link problems (e.g., out-of-synch or radio link failure condition is met), or that the WTRU performs the RRC connection re-establishment procedure.

The WTRU may disable a dormant mode on a condition that the time elapsed between uplink and/or downlink transmissions (e.g., inter-packet inter-burst arrival time) is below a certain threshold (which may be configurable). The WTRU may perform such measurements for one or more subsets of the configured DRBs. For example, the WTRU may keep track of inter-packet or inter-burst arrival times for a set of DRBs configured as XRBs. The WTRU may maintain an average time estimate. The WTRU's time estimates may be reset on a condition that transmissions for SRBs are performed, that transmissions for any RB that is not configured as an XRB is performed, and/or that the WTRU exits a dormant mode.

The WTRU may disable a dormant mode on a condition that the buffer fill rate for uplink and/or downlink transmissions is above a certain threshold (which may be configurable) over a certain period. The WTRU may perform such measurements for one or more subset of the configured DRBs. For example, the WTRU may keep track of buffer fill rate for DRBs configured as XRBs. The WTRU's buffer fill rate estimates may be reset on a condition that transmissions for SRBs are performed, that transmissions for any RB that is not configured as an XRB are performed, and/or that the WTRU exits a dormant mode.

The WTRU may enable and disable a dormant mode using any combination of the above embodiments on a condition that the use of a dormant mode has been configured and/or allowed in the radio resource configuration of the WTRU. The configuration for dormant mode may be in addition to the configuration used while not operating with the dormant mode for aspects such as DRX, PUCCH, SRS and PRACH. The configuration may include, for each aspect, a plurality of parameters, for example, structured as an indexed list of parameters.

A WTRU in connected mode may enable a dormant mode of operation based on an explicit indication in accordance with at least one of the following embodiments.

The WTRU may transit to a dormant mode on a condition that the NAS of the WTRU transmits control signaling (e.g., a NAS service request or a NAS service update) that indicates a request for dormant mode operation. For example, the WTRU may transit to a dormant mode when the NAS of the WTRU receives control signaling that indicates dormant mode operation.

The WTRU may enable a dormant mode on a condition that it receives an RRC message indicating that a dormant mode needs to be enabled. For example, the WTRU may enable a dormant mode on a condition of receipt of an RRC connection reconfiguration message with an indication that the dormant mode needs to be enabled, (e.g., a message including a flag and/or triggering a state transition to a different RRC state, such as RRC_DORMANT or a substate of an RRC idle or connected state that supports dormant behavior). The message may include an index to a set of configuration parameters to use while operating with the dormant mode. The WTRU may confirm the request and/or the reconfiguration in a response message.

Alternatively, the WTRU may enable a dormant mode on a condition that the WTRU receives an RRC connection release message. This message may include an indication that the dormant mode needs to be enabled, (e.g., a message including a flag and/or triggering a state transition to a different RRC state, such as RRC_DORMANT or a substate of the RRC idle or connected state that supports dormant behavior). The WTRU may confirm the request and/or the reconfiguration in a response message. The WTRU may include additional information in the confirmation, including traffic characteristics such as at least one of average inter-packet arrival time with or without mean deviation, average inter-burst arrival time with or without mean deviation, average burst size, buffer fill rate, average packet size, or the like. The WTRU may include information related to the WTRU's mobility. The WTRU may include a selection of preferred parameters such as DRX parameters and/or scheduling request parameters, for example, an index corresponding to parameters selected from a list of available parameters. The message that enables a dormant mode may remove and/or release configured DRB(s) and/or SRB(s), and may add, reconfigure, or maintain an XRB(s).

The WTRU may enable a dormant mode on a condition that it receives L2 control signaling that indicates that a dormant mode needs to be enabled. For example, the WTRU may enable a dormant mode on a condition that that WTRU receives a MAC CE with an indication that a different (e.g., longer) DRX cycle needs to be used. The WTRU may receive signaling (e.g., a MAC CE) that indicates an index to a DRX configuration from a list of available DRX configurations. For example, the indication may correspond to a different (e.g., non-default) configuration for other configuration aspects such as a RACH configuration and/or a PUCCH configuration, (e.g., for D-SR). The signaling may include a dedicated preamble index (e.g., ra-PreambleIndex) and/or a PRACH mask (e.g., a ra-PRACH-MaskIndex). Alternatively, the WTRU may enable a dormant mode on a condition that the WTRU receives a MAC deactivation CE that deactivates secondary serving cells of the WTRU, and indicate that the dormant mode needs to be used for the primary serving cell. Alternatively, the WTRU may enable a dormant mode on a condition that the WTRU receives a MAC deactivation CE that deactivates the primary serving cell of the WTRU, (for example, for a number of subframes that may be indicated in the MAC CE, configured by RRC, or known a priori).

The WTRU may enable a dormant mode on a condition that it receives L1 control signaling that indicates a downlink assignment for a PDSCH transmission and/or an uplink grant for a PUSCH transmission. For example, the WTRU may enable a dormant mode on a condition that control signaling is received within a specific subframe (e.g., within a semi-static configured set of subframes and/or within the on-duration of the DRX active time). Alternatively, the WTRU may enable a dormant mode on a condition that the L1 control signaling is received in a subframe that is part of the DRX active time but not part of the WTRU's DRX on-duration. Alternatively, the WTRU may enable a dormant mode on a condition that it receives L1 control signaling indicating that the WTRU needs to enable a dormant mode, (e.g., using a bit within the DCI format). Alternatively, the WTRU may enable a dormant mode on a condition that the DCI is scrambled using a WTRU-specific RNTI indicating that the WTRU needs to change the state of the dormant mode operation.

The WTRU may enable a dormant mode based on traffic detection function (TDF)-based control plane (CP) policing, (e.g., using conventional TDF enforcing operator policies which are either provided through the policy control rules function (PCRF) or configured by the operator directly in the PGW (i.e., policy control and enforcement function (PCEF)). The TDF/application detection and control function (ACDF) identifies user plane flows that exhibit certain behavior and feeds this information back to the control plane management entities. An example of the behavior includes, but is not limited to, the reception of bursts of small size packets at regular intervals that may cause the establishment or tear down of system resources. Since the detection of such behavior in the user plane may be linked or associated to the control plane disturbances, the PGW (through the SGW) may classify such behavior and communicate its characteristics to the MME (or other control plane entity). The MME may then take an action or pass this information to the eNB or to the WTRU that may then take specific actions. Examples of such specific actions include, but are not limited to, instantiating a new bearer to flush out certain traffic or back off specific control plane events such as an NAS service request.

A WTRU may disable a dormant mode of operation based on an explicit indication in accordance with at least one of the following embodiments.

The WTRU may transit away from a dormant mode on a condition that the NAS of the WTRU transmits control signaling (e.g., a NAS service request or a NAS service update) that indicates an operation not related to a dormant mode, (e.g., resources for transmissions in a connected mode). Alternatively, the WTRU may transit from a dormant mode on a condition that the NAS of the WTRU receives control signaling that indicates an operation not related to a dormant mode (e.g., resources for transmissions in a connected mode).

The WTRU may disable a dormant mode when it receives an RRC message indicating that a dormant mode needs to be disabled. For example, the WTRU may disable a dormant mode on a condition that the WTRU receives an RRC connection reconfiguration message with an indication that the dormant mode needs to be disabled, (e.g., a message including a flag indicating and/or triggering a state transition to a different RRC state, such as RRC_CONNECTED or RRC_IDLE without supporting the dormant behavior).

The WTRU may transit from the dormant mode to a connected state on a condition that the WTRU receives an RRC message which reconfigures the RRC connection, such as an RRC connection reconfiguration request. The RRC connection reconfiguration message may indicate that the dormant behavior needs to be deactivated.

The WTRU may transit from the dormant mode to an idle state on a condition that the WTRU receives an RRC connection release message. The RRC connection release message may include an indication that the dormant mode needs to be disabled, (e.g., a message including a flag indicating that the dormant behavior needs to be deactivated and/or that triggers a state transition to an idle mode, such as RRC_IDLE). The WTRU may confirm the request and/or the reconfiguration in a response message. The messages that disable a dormant mode may remove and/or release any configured radio bearers (e.g., any SRB, DRB, and/or XRB).

The WTRU may disable a dormant mode on a condition that it receives L2 control signaling indicating that a dormant mode needs to be disabled. For example, the L2 control signaling may be a MAC CE with an indication that a different (e.g., shorter) DRX cycle needs to be used, or a MAC activation CE that activates at least one serving cell of the WTRU, e.g., a secondary cell of the WTRU's configuration. The WTRU may receive signaling (e.g., a MAC CE) that indicates an index to a DRX configuration from a list of available DRX configurations. Alternatively, the WTRU may revert back to a default DRX configuration. For example, the WTRU may revert back to a default configuration for other configuration aspects such as a RACH configuration and/or a PUCCH configuration (e.g., for D-SR).

The WTRU may disable a dormant mode on a condition that it receives L1 control signaling that indicates a downlink assignment for a PDSCH transmission and/or an uplink grant for a PUSCH transmission. For example, the WTRU may disable a dormant mode on a condition that the control signaling is received within a specific subframe, such as within a semi-statically configured set of subframes and/or within the on-duration of the DRX active time for multiple consecutive DRX cycles. Alternatively, the WTRU may disable a dormant mode on a condition that it receives L1 control signaling that explicitly indicates that the WTRU needs to disable a dormant mode, for example, using a bit within the DCI format. Alternatively, the WTRU may disable a dormant mode on a condition that the DCI is scrambled using a WTRU-specific RNTI indicating that the WTRU needs to change the state of the dormant mode operation. Alternatively, the WTRU may disable a dormant mode on a condition that the WTRU receives PDCCH signaling that triggers a random access procedure.

Embodiments for deriving scheduling occasions for a WTRU in a dormant mode are explained hereafter.

The WTRU may determine a sequence of one or more subframes for which it may enable reception of control signaling including receiving a PDCCH and decoding for DCIs scrambled with a specific RNTI. In addition, the WTRU may buffer at least part of the corresponding PDSCH such that if a DCI addressed to the WTRU's RNTI, the WTRU may then decode the corresponding transmission on the PDSCH, if needed.

For any of the embodiments described herein, the WTRU may enable and/or disable the reception of control signaling after a fixed number of subframes (e.g. 4 ms or 8 ms), or any period that may correspond to the WTRU processing time.

In addition, the periods during which the WTRU in a dormant mode monitors control signaling may be used to control other behavior of the WTRU. For example, a WTRU may perform channel measurements (if configured), report channel quality indicator (CQI), precoding matrix indicator (PMI), and/or rank indicator (RI) (if configured), transmit a sounding reference signal (SRS) (if configured) in subframes for which it actively monitors a PDCCH, or when it monitors a PDCCH for a WTRU-specific RNTI (e.g., the WTRU's C-RNTI).

In order to allow an eNB to maintain a WTRU time-aligned, the WTRU may transmit an SRS in subframes for which it monitors control signaling. Alternatively, the WTRU may transmit an SRS in a special subframe, which will be explained in detail below, when not having proper timing alignment, in response to the aperiodic SRS request, and/or while the WTRU is monitoring downlink control signaling.

The WTRU may use a DRX mechanism in the dormant mode of operation, for example, to reduce power consumption. The DRX mechanism provides an occasion during which a WTRU may monitor control signaling on, for example, a PDCCH. The DRX mechanism may be a layer 3 (e.g., RRC) mechanism, or alternatively a layer 2 (e.g., MAC) mechanism used in RRC_CONNECTED mode, or a modified mechanism thereof.

The WTRU may enable or disable reception of downlink control signaling for downlink assignments, uplink grants, and DCIs for PDCCH-order to perform the random access procedure independently. For example, if the WTRU has no data available for uplink transmissions but determines that it needs to monitor control signaling in a concerned subframe, it may attempt decoding of control signaling for downlink assignments and for PDCCH-order to perform the random access procedure.

A WTRU in a dormant mode may implicitly enable reception of control signaling for scheduling of unicast transmission(s) using at least one of the following embodiments.

The WTRU may use a layer 3 (L3) DRX mechanism. The WTRU may enable reception of control signaling on a PDCCH and decode for one or more DCI(s) scrambled with an RNTI assigned to the WTRU at the WTRU-specific paging occasion. The RNTI may be a WTRU-specific RNTI (e.g., the WTRU's C-RNTI). The RNTI may be used in decoding attempts on the PDCCH in addition to other RNTIs for which the WTRU may decode at the paging occasion, (e.g., P-RNTI). The WTRU may monitor a PDCCH for its C-RNTI on the WTRU-specific paging occasions as for idle mode procedures. The paging occasion may be extended by a number of subframes (which may be configurable) for which the WTRU may monitor for the assigned RNTI (e.g., the WTRU's C-RNTI).

Alternatively, the WTRU may use an L3 (e.g., RRC) configured occasion that may differ from the WTRU-specific paging occasion. For example, the WTRU may monitor a PDCCH for its C-RNTI on a scheduling occasion. One scheduling frame may correspond to one radio frame, which may contain one or more scheduling occasions. The scheduling frame and the scheduling occasion may be derived using a combination of a formula and DRX parameters provided by RRC (either by broadcasting or using dedicated signaling). For example, the scheduling frame may be determined by a function of the system frame number (SFN) and an identity of the WTRU (e.g., derived from the WTRU's international mobile subscriber identity (IMSI)), while the scheduling occasion may be determined based on an index to a subframe pattern which may be a function of an identity of the WTRU (e.g., derived from the WTRU's IMSI). Alternatively, the scheduling frame and the scheduling occasion may be received via dedicated signaling (e.g., RRC), for example, as part of a radio resource configuration procedure or a signaling procedure for configuring DRX for the WTRU. The WTRU follows a DRX cycle, and the cycle corresponds to the individual time interval between monitoring scheduling occasions for a specific WTRU. The WTRU may monitor at least one scheduling occasion per DRX cycle.

Alternatively, the WTRU may use a layer 2 (L2) DRX mechanism. The WTRU may be configured with, or may autonomously derive, one or more DRX configurations for L2 DRX operation. For example, the WTRU may use a multiple of the configured layer 2 DRX cycle and/or may be configured with an additional DRX cycle. For example, the WTRU may enable reception of control signaling on a PDCCH and decode for one or more DCI(s) scrambled with an RNTI assigned to the WTRU from the subframe at which a scheduling request is triggered. The RNTI may be a WTRU-specific RNTI (e.g., the WTRU's C-RNTI). The WTRU may monitor a PDCCH for its C-RNTI for subframes during which a scheduling request (SR) is pending. The SR may be triggered (and/or is pending) for an SRB, (e.g., when new data becomes available for the SRB). The SR may be triggered (and/or is pending) for a DRB, (e.g., when new data becomes available for the DRB). The SR may be triggered for a DRB that is not configured as an XRB. The SR may be triggered (and/or is pending) for an RB associated to an LCH/LCG with a higher priority than a threshold, (e.g., when new data becomes available for the DRB). The SR may be triggered (and/or is pending) from the availability of transmission of an L3 message (e.g., measurement report), for example, of a specific type, such as serving cell below threshold.

Alternatively, the WTRU may enable reception of control signaling on a PDCCH in a subframe subsequent to the transmission of a random access preamble on a PRACH resource. The WTRU may decode for an RA-RNTI for a random access response and for a C-RNTI, if a dedicated preamble is used for the RACH.

For any of the above, once the WTRU successfully decodes at least one control signaling, the PDCCH monitoring activity may be extended, including the cases where a DCI is received including scheduling information, (for example, if a DCI is decoded that requests an aperiodic SRS transmission for the purpose of providing a "keep-alive" and/or for timing alignment purposes at the eNB, or if a DCI is decoded that triggers the random access procedure).

A WTRU in a dormant mode may implicitly disable reception of control signaling for scheduling of unicast transmissions. For example, on a condition that the WTRU successfully decodes a DCI, it may extend the PDCCH monitoring activity for a number of subsequent subframes, (e.g., based on a timer which may be restarted upon successful decoding of control signaling and/or using an L2 DRX if configured), until the relevant timer(s) expires such that the WTRU may disable reception of control signaling at least until the next wake-up occasion.

A WTRU in a dormant mode may enable reception of control signaling for scheduling of unicast transmission(s) based on explicit signaling.

The WTRU may be configured with wake-up occasions that occur at periodic intervals. Alternatively, the WTRU may enable reception of control signaling on a PDCCH and decode for one or more DCI(s) scrambled with an RNTI assigned to the WTRU (e.g., a C-RNTI) after reception of a paging message that includes at least one paging record with an identifier of the WTRU (e.g., a WTRU identity in the paging record that matches one of the WTRU identities allocated by upper layers or by RRC). The paging message may include dedicated information for the WTRU, such as a C-RNTI and/or a (dedicated) preamble and/or a (dedicated) PRACH resource.

The WTRU may initiate the random access procedure following the reception of the paging message. The random access procedure may be performed on a condition that the WTRU has no valid timing alignment, or the WTRU has no configuration for a transmission on a PUSCH without first having a valid timing alignment (e.g., if the WTRU is not allowed to transmit on a PUSCH without time alignment in the uplink).

For any of the above, once the WTRU successfully decodes at least one control signal, the PDCCH monitoring activity may be extended. For example, it may be the case where a DCI received includes scheduling information, for example, if a DCI is decoded that requests an aperiodic SRS transmission (e.g., for the purpose of providing a "keep-alive" and/or for timing alignment purposes at the eNB).

A WTRU in a dormant mode may disable reception of control signaling for scheduling of unicast transmission(s) based on explicit signaling. The explicit signaling includes L3 signaling (e.g., RRC), L2 signaling (e.g., MAC CE), and L1 signaling (e.g., DCI with explicit indication). For example, the WTRU may disable reception of control signaling upon reception of a MAC DRX CE indicating that the WTRU may stop monitoring a PDCCH. Alternatively, a specific MAC CE may be defined for this purpose. For example, the WTRU may disable reception of control signaling upon receipt of a DCI that includes an indication that the WTRU may disable reception of control signaling, or alternatively a DCI scrambled with a specific RNTI.

Embodiments for downlink and/or uplink data transmissions in a dormant mode are disclosed hereafter. The traffic pattern for intermittent transmissions of small data may be characterized by downlink data transfer only (e.g. a "keep-alive"-type of message from a network service), downlink data transfer followed by an uplink data transfer (e.g., request-response type of messages, such as a request originating from a network service (e.g., a location-based service and/or a push-based service (e.g., email)), uplink data transfer only (e.g., a keep-alive type of message from an application), and uplink data transfer followed by a downlink data transfer (e.g., request-response type of messages, such as a request originating from an application in a mobile terminal (e.g., a location-based client and/or a fetch-based service (e.g., an email client)).

A WTRU in a dormant mode may monitor control signaling according to one or more embodiments disclosed herein to determine scheduling occasions. While in a dormant mode, the WTRU may use the connectionless approach or control plane/signaling bearers to transfer small data. A WTRU may perform any of the following procedures for each corresponding data transfer when initiated.

A WTRU may be scheduled for an uplink transmission while the WTRU may not have proper timing alignment, (e.g., when the TA timer expired for the WTRU).

In one embodiment, a WTRU may be configured for uplink transmissions in a special subframe that may tolerate a timing misalignment. The special subframe may include at least one guard period, (e.g., a number of symbols sufficiently large that may be based on the size of the cell) such that even a large timing misalignment would not interfere with other intra-cell transmissions in adjacent subframes. For example, one guard period may be defined at the beginning and/or at the end of a subframe. The WTRU may perform an unsynchronized transmission, (e.g., a random access procedure including a RACH preamble transmission on a PRACH resource, a PUCCH or PUSCH transmission), in the special subframe. The random access in the special subframe may be contention-free.

The WTRU may receive dedicated signaling (e.g., RRC) that configures in a semi-static manner (e.g. periodic in time) one or more special subframes. Alternatively, the WTRU may receive dynamic PDCCH control signaling (e.g., DCI for a grant for a PUSCH transmission). Alternatively, the WTRU may receive broadcast signaling (e.g., system information broadcast on a broadcast control channel (BCCH)) that indicates one or more special subframes and/or a periodicity. The network may handle any possible intra-cell and inter-cell interference through appropriate allocation of uplink resources. For example, such subframe may be a recurrent subframe (e.g., subframe 1 of each integer X number of radio frames, where X may be 1 or larger).

Other WTRUs may not be allowed to transmit in the special subframe. The format of the special subframe may be understood by a WTRU(s) supporting transmissions in the special subframe. For the WTRUs that do not support transmissions in the special subframe, the special subframe may be configured as a multicast/broadcast over a single frequency network (MBSFN) subframe. This would ensure backward compatibility for the non-supporting WTRUs, while preventing intra-cell and inter-cell interference within the special subframe.

A WTRU that does not have proper timing alignment may perform an uplink transmissions on a PUSCH resource in the special subframe according to PDCCH control signaling, but may not perform PUSCH transmission on other subframes. The special subframe may not be constrained to PUSCH or PRACH transmissions, but may apply to SRS transmissions (if configured) or any other physical channel transmissions. This will be referred to as an "uplink transmission in the special subframe."

For special subframes, the WTRU may be configured with at least one of the following: parameters for decoding and processing of dynamic downlink control signaling that schedules uplink transmissions on a contention-based PUSCH (CB-PUSCH) resource including, for example, a specific RNTI to monitor on the PDCCH (e.g. a CB-RNTI), a subframe in which the WTRU may decode the control signaling for CB-PUSCH transmissions, a subframe in which the WTRU may perform a transmission on a CB-PUSCH resource, or the like. The configuration may be similar to SPS configuration with respect to the periodicity of the resources, parameters such as RNTI, resource allocation (e.g., resource blocks) and modulation and coding scheme (MSC).

The WTRU may periodically monitor and decode DCIs scrambled with a CB-RNTI on a PDCCH to determine the parameters to perform an uplink transmission. The WTRU may decode the control signaling on at least one of the conditions that it has data available for transmission, the data corresponds to an XRB, or the WTRU has a buffer status report (BSR) to transmit (e.g., for data from any RBs including an SRB), or the WTRU has valid uplink timing synchronization.

A WTRU may receive dedicated PRACH resources valid for the WTRU-specific subframe(s). For the WTRU-specific subframes, the WTRU may be configured with at least one of the following: dedicated parameters for transmissions on a PRACH resource, a dedicated preamble (ra-PreambleIndex), a PRACH mask index (PRACH-Mask-index), a maximum number of preamble retransmissions, or the like. For example, the WTRU may be configured with a dedicated preamble (e.g., for a contention-free transmission on the PRACH resource) and/or with a dedicated PRACH resource (e.g., for multiplexing different WTRUs for a given subframe). The WTRU may perform a transmission on a PRACH using the configuration in a subset of subframes. This subset of subframe may be configured by the network, for example, using a periodicity, a bit mask applicable to a plurality of subframes (e.g., a frame, or a multiple thereof), and/or a function of a system frame number (SFN). This procedure will be referred to as a "CFRA transmission in a WTRU-specific subframe."

The WTRU may be configured with multiple sets of PRACH parameters to convey additional information to the network. Such information may include HARQ feedback, a request for uplink resources including resources for XRB(s) and/or resources for radio bearers other than XRBs (e.g., with higher priority). The parameters that may be configured to convey such information include separate sets of PRACH resources, different sets of WTRU-specific subframes for PRACH, and/or different set of dedicated preambles. For example, when the WTRU performs a preamble transmission in the WTRU-specific PRACH occasion for the purpose of requesting uplink resources, the WTRU may select either a first dedicated preamble to indicate scheduling request (i.e., scheduling request via random access procedure (RA-SR)) for any type of data in the WTRU's buffer (including a BSR) or a second preamble to indicate SR for data corresponding to XRBs. Alternatively, a first preamble may indicate SR for XRBs (for uplink transmissions of user data while remaining in dormant mode) and a second preamble for SRBs (e.g., to request a RRC connection that exits the dormant behavior). Alternatively, for the previous example above, instead of selecting between a first and a second preamble, the WTRU may instead select between a first and a second WTRU-specific subframe. Alternatively, the WTRU may select between a first and a second PRACH resource. Alternatively, the WTRU may select between a first configuration for scheduling request such as a PRACH configuration and a second configuration for scheduling request such as a PUCCH configuration for D-SR, on the condition that the WTRU has valid uplink timing alignment.

The WTRU may perform a preamble transmission in the WTRU-specific PRACH occasion (i.e., in the WTRU-specific subframe) for sending HARQ feedback corresponding to one or a plurality (e.g., a burst) of transmissions or retransmissions, for example, for XRBs. The WTRU may select a first preamble such that it corresponds to a HARQ acknowledgement, or to acknowledge the entire burst. The WTRU may select a second preamble to perform RA-SR and/or to indicate a HARQ NACK. An RLC report may be included in the first uplink transmission which allows the network to determine whether or not to perform the retransmission at the RLC. Alternatively, instead of selecting between first and second preambles, the WTRU may instead select between first and second WTRU-specific subframes. Alternatively, the WTRU may select between first and second PRACH resources. Alternatively, the WTRU may select the preamble used to indicate HARQ feedback (e.g., a HARQ ACK) as a function of the first Control Channel Element (CCE) of the DCI received on the PDCCH signaling, which DCI scheduled the downlink transmission for which HARQ feedback is transmitted. In case the feedback corresponds to a plurality of transmissions (e.g., a burst), the preamble selected may be a function of the DCI that scheduled the last transmission in the burst. In case the feedback corresponds to a plurality of transmissions (e.g., a burst), the HARQ feedback may be an ACK on a condition that all downlink transmissions of the bundle have been successfully received. Alternatively, a preamble may be transmitted on a condition that at least one transmission in a burst was successfully received. The preamble selected may be a function of the number of transmission successfully received in the burst, for example, for consecutive transmissions starting from the last transmission for which a positive acknowledgement has not been sent.

Alternatively, a WTRU in a dormant mode may use a conventional procedure to access the network in subframes other than the WTRU-specific subframe, for example, for data other than data associated to an XRB (that may exclude a BSR). For example, the WTRU may use a random access procedure using cell parameters or other dedicated parameters that may not correspond to those associated to a PRACH transmission for the WTRU-specific subframe, or use a scheduling request on a PUCCH if configured on a condition that the WTRU has valid uplink synchronization, for example, to establish an RRC connection and/or to request dedicated transmission resources when data for which the dormant behavior is not suitable becomes available for transmission. Such data may correspond to data with a higher priority (e.g., SRB data, DRB data). Such data may correspond to data for any radio bearer that is not an XRB of the WTRU's configuration. Alternatively, if the WTRU receives control signaling on a PDCCH that requests the WTRU to perform the random access procedure, the WTRU may perform the conventional random access procedure.

The WTRU operating in a dormant mode may initiate a procedure to gain valid uplink timing alignment (e.g., random access including a CFRA transmission in a WTRU-specific subframe, or SRS transmission in the special subframe if configured) if the WTRU does not have a valid uplink timing alignment, (e.g., a TAT is not running at least for the primary serving cell). The WTRU may be configured (e.g., by upper layers) to gain timing alignment on a condition that the WTRU in a dormant mode receives successful downlink control signaling indicating a PDSCH assignment (such that the WTRU may subsequently transmit HARQ A/N on a PUCCH), or downlink control signaling indicating a PUSCH grant (such that the WTRU may subsequently transmit on a PUSCH). The WTRU may not perform the transmission on the PUSCH for the grant if the WTRU does not have a valid timing alignment in the concerned subframe.

The WTRU operating in a dormant mode may initiate a procedure to gain valid uplink timing alignment on a condition that the WTRU has data available for transmission in its buffer (e.g., a BSR has been triggered), or the WTRU has a pending scheduling request, or if the WTRU determines that it needs to obtain a valid timing alignment while in a dormant mode, (e.g., to initiate a random access procedure).

For downlink data transfer, a WTRU operating in a dormant mode may receive and decode dedicated downlink assignment(s) on a PDCCH (e.g., scrambled using a C-RNTI), whether or not the WTRU has a valid time alignment (TA). In case the WTRU has a valid TA, the WTRU may transmit HARQ A/N feedback (e.g., on a PUCCH). Otherwise, the WTRU may not transmit any HARQ A/N feedback. Alternatively, the WTRU may perform a CFRA transmission in a WTRU-specific subframe to gain uplink timing synchronization and/or to acknowledge the downlink transmission.

For downlink data transfer followed by uplink data transfer, a WTRU operating in a dormant mode may receive and decode dedicated downlink assignment(s) on a PDCCH (e.g., scrambled using C-RNTI), whether or not the WTRU has a valid TA. In case the WTRU has a valid TA, the WTRU may transmit HARQ A/N feedback (e.g., on a PUCCH) after receiving the downlink transmission. Alternatively, the WTRU operating in a dormant mode may receive and decode control signaling on a PDCCH (e.g., scrambled using a C-RNTI) that orders the WTRU to perform a random access procedure, in particular, if the WTRU does not have a valid TA. The WTRU may receive and decode control signaling (e.g., an uplink grant) on a PDCCH (e.g., scrambled using C-RNTI) for an uplink transmission on a dedicated PUSCH resource, if the WTRU has a valid TA. Alternatively, the WTRU may transmit on a dedicated PUSCH resource using the special subframe, if the timing of the grant corresponds to the special subframe and if the WTRU does not have a valid timing alignment. The WTRU may receive and decode control signaling (e.g., an uplink grant) on a PDCCH (e.g., scrambled using a contention based RNTI (CB-RNTI)) for a contention-based uplink transmission on a PUSCH. The WTRU may transmit on a PUSCH resource in case the WTRU has a valid TA. The WTRU may transmit on a PUSCH resource in the special subframe, if the WTRU does not have a valid timing alignment and/or if the timing of the grant corresponds to the special subframe.

The WTRU may initiate the scheduling request (SR) procedure either using a valid PUCCH resource, using a CFRA transmission in a WTRU-specific subframe if configured, or using a random access procedure. The WTRU may initiate the SR procedure on a condition that no contention-based grant is available for the concerned subframe. For example, the PUCCH resource for D-SR may be a resource configured for use while in a dormant mode. Alternatively, the method and/or the resource to use for the SR may be signaled in a downlink transmission such as in a MAC CE.

For uplink data transfer, a WTRU operating in a dormant mode may initiate the SR procedure either using a valid PUCCH resource for SR, using a CFRA transmission in a WTRU-specific subframe if configured, or using a random access procedure. The WTRU may initiate the SR procedure on a condition that no contention-based grant is available for the concerned subframe.

The WTRU may receive and decode control signaling (e.g., an uplink grant) on a PDCCH (e.g., scrambled using C-RNTI) for an uplink transmission. The WTRU may transmit on a dedicated PUSCH resource on a condition that the WTRU have a valid TA. Alternatively, the WTRU may transmit on a dedicated PUSCH resource in the special subframe, if the timing of the grant corresponds to the special subframe and if the WTRU does not have a valid timing alignment.

The WTRU may receive and decode control signaling (e.g., an uplink grant) on a PDCCH (e.g., scrambled using a CB-RNTI) for a contention-based uplink transmission on a PUSCH. In this case, the WTRU may transmit on a PUSCH resource if the WTRU has a valid TA, or on a PUSCH resource in the special subframe on a condition that the WTRU does not have a valid timing alignment and/or the timing of the grant corresponds to the special subframe.

For uplink data transfer followed by downlink data transfer, a WTRU operating in a dormant mode may initiate the SR procedure either using a valid PUCCH resource for SR, using a CFRA transmission in a WTRU-specific subframe, or using a random access procedure. The WTRU may initiate the SR procedure on a condition that no contention-based grant is available for the concerned subframe.

The WTRU may receive and decode control signaling (e.g., an uplink grant) on a PDCCH (e.g., scrambled using C-RNTI) for an uplink transmission. The WTRU may transmit on a dedicated PUSCH resource on a condition that the WTRU has a valid TA, or on a dedicated PUSCH resources in the special subframe, if the timing of the grant corresponds to the special subframe and if the WTRU does not have a valid timing alignment.

The WTRU may receive and decode control signaling (e.g., an uplink grant) on a PDCCH (e.g., scrambled using a CB-RNTI) for a contention-based uplink transmission on a PUSCH. In this case, the WTRU may transmit on a PUSCH resource if the WTRU has a valid TA, or on a PUSCH resource in the special subframe on a condition that the WTRU does not have a valid timing alignment and/or the timing of the grant corresponds to the special subframe.

In addition, the WTRU may receive and decode dedicated downlink assignment(s) on a PDCCH (e.g., scrambled using a C-RNTI), whether or not the WTRU has valid time alignment. In case the WTRU has a valid TA, the WTRU may transmit HARQ A/N feedback (e.g., on a PUCCH).

Embodiments for channel quality measurements and reporting in a dormant mode are disclosed hereafter. A WTRU operating in a dormant mode may be configured with channel state information reporting, such as channel quality indicator (CQI), precoding matrix indicator (PMI), rank indicator (RI), or the like. The WTRU may maintain the CQI configuration when it has no valid timing alignment. For example, the WTRU may not apply the default physical channel configuration for CQI-ReportConfig and cqi-Mask upon TAT expiry.

The WTRU may measure and report channel state information, such as a CQI, a PMI, and/or an RI, for subframes for which it monitors control signaling on a PDCCH. The WTRU may measure and report starting from a subframe in which the WTRU successfully decodes control signaling. The WTRU may measure and report a CQI, a PMI, and/or an RI in subframes for which it monitors control signaling on a PDCCH, for example, starting from a subframe in which the WTRU successfully decodes control signaling. The above may be applied to SRS configuration parameters (e.g., soundingRS-UL-ConfigDedicated) and procedures.

Embodiments for performing mobility-related procedures in a dormant mode are disclosed hereafter.

A WTRU operating in a dormant mode may support both network-controlled mobility (e.g., using configured L3 measurements) and WTRU-autonomous mobility (e.g., using cell reselection).

A WTRU operating in a dormant mode may perform cell reselection on a condition that no L3 measurements are configured, or during periods when the WTRU is not being actively scheduled by the network for unicast transmissions.

A WTRU operating in a dormant mode may perform L3 measurements and measurement reporting with lower requirements in terms of measurement intervals compared to the RRC_CONNECTED state. The WTRU may perform L3 measurements and reporting during periods when the WTRU is being actively scheduled by the network for unicast transmissions. The WTRU may release cell-specific WTRU-dedicated parameters when a mobility event occurs while the WTRU is in a dormant mode. For example, the WTRU may release any dedicated configuration for random access, C-RNTI, configuration for scheduling occasions, DRX, and/or measurements, and the like that may have remained valid while in a dormant mode. Such mobility event includes, but is not limited to, reception of an RRC connection reconfiguration message with a mobility control IE (handover command), the initiation of a cell (re)selection procedure, a cell (re)selection procedure that results in selection of a different cell than the current serving cell, a traffic area update, a transition to the RRC_IDLE mode, and/or stopping using the dormant behavior.

A WTRU operating in a dormant mode may be configured with L3 measurements and, if configured, the WTRU may perform the measurements during period when it is actively being scheduled by the network for unicast transmissions. For example, a WTRU may, for a period of time, perform L3 measurements starting from the subframe in which it first receives control signaling for a downlink assignment and/or an uplink grant until, for example, a timer expires (e.g., the TA timer, or any other activity timer) or until it stops monitoring the control signaling. The WTRU may report the measurements when triggered by an event during a period when it is actively being scheduled by the network for unicast transmissions.

Embodiments for cell reselection and WTRU-controlled mobility are disclosed hereafter. A WTRU operating in a dormant mode may perform cell reselection procedure according to idle mode procedures. The WTRU may perform the cell reselection procedure if it has successfully received explicit indication to start monitoring control signaling but has not successfully decoded control signaling after a certain period of time. The WTRU may perform the initial connection establishment procedure in the selected cell.

If the cell reselection procedure leads to the selection of a cell different than the one on which the WTRU operates, the WTRU may perform at least one of the following. If the cell reselection occurs while the WTRU is being actively scheduled, the WTRU may move to idle mode and perform the initial connection establishment procedure in the selected cell. If the cell reselection occurs while the WTRU is not being actively scheduled, the WTRU may move to idle mode and camp on the selected cell. Alternatively, the WTRU may perform the initial connection establishment procedure in the selected cell.

If the cell reselection occurs after the WTRU has successfully received explicit indication to start monitoring control signaling but before the WTRU is first being actively scheduled, the WTRU may move to idle mode and perform the initial connection establishment procedure in the selected cell.

In any embodiments above, the WTRU may first attempt the connection re-establishment procedure in the selected cell. If the WTRU is configured for measurement reporting and performs L3 measurements, the WTRU may not perform cell reselection procedure, for example, if the WTRU performs L3 measurements while the WTRU is being actively scheduled.

Embodiments for configuring a radio bearer (XRB) for intermittent services are disclosed hereafter. The WTRU may be configured with an XRB that is associated with one or more evolved packet system (EPS) bearers. For example, a WTRU may be configured with one or more XRBs each associated to a value that corresponds to an EPS bearer, (e.g., an eps-BearerIdentity value). When the dormant mode is activated, the WTRU may use the XRB for the transmission of user data (e.g., excluding control plane data) corresponding to the concerned EPS bearer. One or more EPS bearers may be associated to a given XRB.

In another embodiment, a WTRU may be configured with a single XRB. This may be the default behavior, or alternatively this may be indicated using either a flag or a fixed codepoint for the value of the eps-BearerIdentity. When the dormant behavior is activated, the WTRU may use the XRB for the transmission of any user data (e.g., excluding control plane data) corresponding to any of the EPS bearers of the WTRU's configuration. This may apply to EPS bearers that are configured when the WTRU initiates the use of a dormant behavior.

In another embodiment, the WTRU may be configured with one XRB for each configured RB, e.g., there may be one XRB for each DRB of the WTRU's configuration. For example, when the dormant behavior is activated, the WTRU may use the XRB for transmission of any user data (e.g., excluding control plane data) corresponding to the associated RB (e.g., a DRB) of the WTRU's configuration.

In another embodiment, the WTRU may be configured with one XRB for each default EPS bearer of the WTRU's configuration. When the dormant behavior is activated, the WTRU may use the XRB for the transmission of any user data (e.g., excluding control plane data) corresponding to the associated EPS bearer of the WTRU's configuration. This may be applied to bearers that are configured when the WTRU initiates the use of a dormant behavior.

In another embodiment, the WTRU may be configured with a default XRB. When the dormant behavior is activated, the WTRU may use the default XRB for the transmission of user data (e.g., excluding control plane data) corresponding to any EPS bearer that is not explicitly associated to another XRB. This may be applied to EPS bearers that share a similar context (e.g., for applications that use the same source IP address). This may be applied to EPS bearers configured at the time that the WTRU receives a configuration that adds the XRB.

Any of the above alternatives may be realized such that a DRB operates as an XRB when a dormant behavior is activated. When the dormant behavior is deactivated and the WTRU remains in a connected state, the XRB may revert to its normal DRB operation.

The WTRU may be configured such that, for a given XRB, a subset of user data (e.g., excluding control plane data) for a given EPS bearer may be transmitted using the configured XRB when a dormant behavior is activated. Such data may be identified using any of the embodiments for flow classification and routing, which will be explained in detail below.

The WTRU may handle user data that is not associated with an XRB according to methods applicable when a dormant behavior is not applicable. For example, for an unsynchronized WTRU with activated dormant behavior, new data that becomes available for transmission that may not be transmitted using an XRB may trigger the establishment of an RRC connection (if the WTRU does not have an established RRC connection) and/or scheduling request using random access to request uplink resources to enable a transmission using a DRB.

The WTRU may not trigger a BSR and/or an SR when new data becomes available for the XRB (e.g., based on the parameter logicalChannelSR-Mask-R1x in the LogicalChannelConfiguration IE). This may be applied if a dormant behavior is activated. For example, a WTRU that uses a dormant behavior may trigger a BSR and/or an SR when new data becomes available for a DRB or an SRB that is not configured as (or associated to) an XRB. The WTRU may trigger a BSR and/or an SR for an XRB that is configured such that a BSR and/or SR trigger is allowed according to a configuration of the WTRU. As another example, a WTRU that uses a dormant behavior may trigger a BSR and/or an SR when new data becomes available for an XRB that is configured such that such BSR and/or SR is not prohibited according to a configuration of the WTRU.

The WTRU may initiate a procedure for transmission of data on uplink resources in a special subframe when new data becomes available for an XRB. The WTRU may initiate such procedure if a dormant behavior is activated.

The logical channel configuration (LCH) of the XRB may not be associated to a logical channel group (LCG), for example, in the LogicalChannelConfiguration IE. The logical channel configuration of the XRB may have a lower priority than that of an SRB. An XRB may have the lowest priority among radio bearers of a WTRU's configuration. This may be applied if a dormant behavior is activated.

The configuration of the XRB may include an explicit indication, such that the WTRU may determine whether or not the concerned XRB may be used as a DRB for user plane traffic that may benefit from the dormant behavior (e.g., using a parameter logicalChannelDormant-Mask-R1x in the LogicalChannelConfiguration IE).

The WTRU may configure an XRB for operation without header compression configured. The WTRU may transmit data on an XRB without security activated, (e.g., without encryption). This may be a configurable aspect of an XRB. The WTRU may be configured such that an XRB uses the RLC Unacknowledged Mode (RLC UM) operation. The WTRU may be configured such that RLC segmentation is not allowed for data transmission while operating in a dormant mode (e.g., for data that corresponds to an XRB). The WTRU may disable dormancy behavior for the concerned data transfer if the data transmission cannot be accommodated by the transport block without segmentation.

The WTRU may be configured with one or more XRBs. When a plurality of XRBs are configured, each may be configured to support different levels of QoS, including parameters, but not limited to, a priority (e.g., priority in the LogicalChannelConfig IE), an SDU discard timer (e.g., discardTimer in PDCP-Config IE), a bucket size duration (e.g., bucketSizeDuration in the LogicalChannelConfig IE), a prioritized bit rate (PBR) (e.g., prioritizedBitRate in the LogicalChannelConfig IE), or the like.

For the control plane, the WTRU may handle control plane data that is not associated with an XRB (e.g., data for an SRB) according to any methods applicable when a dormant behavior is not applicable.

The WTRU may have one XRB for SRB0. SRB0 may be used to (re)establish the RRC connection and/or to transit to an RRC connected mode. The WTRU may additionally have one XRB for SRB0, and one XRB for both SRB1 and SRB2. Alternatively, the WTRU may have one XRB for each SRB (i.e., SRB0, SRB1, SRB2). Alternatively, the WTRU may additionally have one XRB for all SRBs. Alternatively, the XRB may be configured by configuring SRBs to transmit user data with control signaling.

Embodiments for flow classification and routing are disclosed hereafter. A WTRU may be configured with an XRB that is associated to an EPS bearer(s) pertaining to a single PGW or it may be configured with an XRB that is associated to EPS bearers from multiple PGWs. When the WTRU is configured with an XRB that is associated with traffic from more than one EPS bearer, the eNB may perform flow classification and routing of user's data towards the proper PGW. Alternatively, when the WTRU is configured with an XRB that is associated with traffic from more than one EPS, the WTRU may perform flow classification and routing of user data towards the proper PGW. Alternately, a WTRU may be configured with an XRB that is associated to a particular access point name (APN) i.e., there may be one or more XRBs per APN the WTRU is connected to. In this case, the WTRU may perform traffic flow classification and routing of user data towards the appropriate APN. If those APNs are accessed through the same P-GW, the P-GW may differentiate the traffic for each APN and route the packet to the correct network.

A WTRU having a dormant behavior activated may perform flow classification on traffic generated by different services and/or applications. The WTRU may be configured with a plurality of packet filters and/or traffic flow templates (TFTs). The WTRU may be configured with first set of packet filters and/or TFTs that may be used when the dormant behavior is not activated, and with a second set that may be used otherwise.

The WTRU may determine, using the configured and applicable packet filter and/or TFTs, when data may be transmitted using an XRB. These packet filters may be configured in the WTRU by the MME. The MME may send the packet filters in an activate bearer message, a modify bearer message, or a new dedicated NAS message towards the WTRU when the EPS bearers are setup. It may be specified in the NAS message that there is a different set of packet filters which may be applied differently depending on whether the WTRU is in a connected mode or a dormant mode. Alternatively, the dormant mode packet filters may be sent to the WTRU at the time the WTRU enters the dormancy mode. This is performed by the NAS message which informs the WTRU to enter EMM-Dormant mode.

The WTRU may provide further information related to routing and flow classification to the eNB. For example, such information may include the number of DRBs and/or details related to packet size (e.g., average, maximum, minimum), inter-packet and/or inter-burst delay (e.g., average, maximum, minimum), number of packets in a burst, protocol type (e.g., transmission control protocol (TCP), user datagram protocol (UDP), real-time transmit protocol (RTP), real-time transmit control protocol (RTCP)). The eNB may use this information to properly configure the WTRU for the dormant behavior, including XRB configuration. The eNB may use this information to perform correct mapping of data received for a given XRB to the S1-U bearers on the link towards the SGW.

Alternatively, the XRB data may be provided to an equivalent S1-U XRB towards the SGW. A similar functionality may be implemented at the SGW to map the packets to the correct S5 bearer towards the PDN GW. This may imply the setup (at all time or upon entering of dormant mode or upon setup of XRB) of an equivalent S1-U XRB between the eNB and the SGW.

Additional means to classify packets may be provided by means of extension to packet filters, such that at least one of the following may be received by the WTRU, for example, for the purpose of flow classification.

Packet filters may include parameters related to the size of a packet, (e.g., maximum size or minimum size). The size may be derived from the length field of the IP header or the transport header. Alternatively, the size may be derived from the packet data convergence protocol (PDCP) service data unit (SDU) size (uncompressed IP header).

Packet filters may include metrics applicable to the filter including at least one of a value for inter-packet arrival time for a given rule of the filter, parameters to characterize a burst (number of transmissions within a given time), a value for inter-packet arrival time for a given rule of the filter, or a rate at which the rule is being matched by packets. These value may be used as a threshold and used as additional rules to validate the filter entry.

The embodiments to trigger dormancy behavior for the WTRU may be applied at the layer of packet filters and TFTs based on the observation of how the packets are filtered and/or the observations about classification of the packets. When there is such a trigger the WTRU may enter or leave the dormancy behavior or may send an NAS service request or service update message, or change the RRC/NAS states. Once the WTRU enters the dormant mode, the WTRU may switch the packet filters and start routing data towards the XRB or the packet filter may be configured in such a way that the WTRU discards some of the background traffic. Alternatively, the WTRU may choose to use the connectionless approach to transmit data (i.e., sending data over the control plane).

Embodiments for session managements for radio access bearers (RABs) with a dormant behavior are disclosed hereafter. When a WTRU has a dormant behavior activated and the WTRU performs a mobility-related procedure, (e.g., either a WTRU-autonomous procedure such as a cell (re)

selection procedure that changes the cell on which the WTRU is camping, or an eNB-controlled procedure (e.g., a handover to a different cell, for example, in case where the WTRU implements a dormant mode behavior as an extension to a connected mode)), the WTRU may perform at least one of the following. The WTRU may maintain at least the XRB in the WTRU's context, unless the dormant mode is deactivated or unless indicated otherwise by explicit signaling (e.g., in the RRC connection reconfiguration message with mobility control IE (i.e., handover command)). The WTRU may maintain any DRB(s) associated to the XRB.

For a WTRU-autonomous procedure, the WTRU may initiate a new service request to reestablish the radio access bearers. The WTRU may perform this service request either using RRC signaling (e.g., the target eNB may reestablish the connection with the concerned MME) or using an NAS procedure. This may be applied if RABs are not maintained and released autonomously following a WTRU-autonomous mobility event.

For a WTRU-autonomous procedure, the WTRU may initiate a procedure such that the WTRU may indicate to the network its new location. This may provide means for the network to setup the WTRU's context to the target eNB. For example, the WTRU may initiate the tracking area update (TAU) procedure. The TAU procedure may include an indication that resources may be allocated for EPS bearers of the WTRU's context.

For a WTRU-autonomous procedure, the WTRU may deactivate the dormant behavior including the release of any configured XRB. The WTRU may then initiate a procedure such that the WTRU may indicate to the network its new location. This may provide means for the network to establish an RRC connection with the WTRU such that a dormant behavior may be reconfigured, if needed. For example, the WTRU may initiate the TAU procedure. The TAU procedure may include an indication that resources should be allocated for EPS bearers of the WTRU's context.

The above embodiments may apply when a WTRU wants or attempts to exit the dormant behavior. The exit of dormant mode may be due to a need to setup resources for additional user plane traffic, traffic that requires dedicated bearer(s), or the exit may be due to a pending NAS session management procedure (activation, modification, or deactivation of at least one dedicated EPS bearer). The WTRU may exit the dormant mode as a result of manual closed subscriber group (CSG) selection. If the exit of the dormant mode is controlled by the RRC (or lower layers), the NAS may provide indications (based on the listed triggers above) to the RRC (or lower layers) which may lead to the exit of the dormant mode by the RRC (or lower layers).

The NAS signaling may be extended to support a dormant mode. A WTRU may determine that it needs additional resources for operation in the dormant behavior, either because the WTRU determines that it needs to activate a dormant mode or because it already uses a dormant behavior but needs additional resources for operation in the dormant behavior. The WTRU may be allowed to initiate an NAS service request procedure in that case. The WTRU may initiate the NAS service request procedure in the current RRC mode (e.g., CONNECTED, DORMANT, IDLE) and/ or EMM state (e.g., EMM-CONNECTED, EMM-DORMANT, EMM-IDLE) that supports a dormant behavior. The WTRU may be allowed to transmit an NAS service request in a connected mode. This procedure, if accepted by the network, may trigger the setup of additional resources for dedicated or default bearer(s) that are active for the WTRU. Alternatively, the WTRU may receive an NAS response in case the network initiate the modification to the WTRU's currently allocated resources. The response may be a new NAS message or an existing session or mobility management message (e.g., with additional IE).

The WTRU may determine that it needs additional resources, for example, because the WTRU determines that it needs to deactivate a dormant mode. The WTRU may be allowed to initiate an NAS service request procedure in that case. In other words, the WTRU may initiate the NAS service request procedure in the RRC mode (e.g., CONNECTED, DORMANT, IDLE) and/or EMM state (e.g., EMM-CONNECTED, EMM-DORMANT, EMM-IDLE) that supports a dormant behavior. Alternatively, the WTRU may receive an NAS service request in case the network initiate the modification to the WTRU's currently allocated resources.

The setup of additional resources, due to a WTRU-initiated NAS service request procedure, or due to a network-initiated NAS service request procedure (i.e., paging followed by NAS service request from the WTRU), or any dedicated NAS message that triggers an NAS service request (or similar NAS procedure) by the WTRU, may result in the WTRU exiting or deactivating the dormant behavior. Alternatively, the WTRU may be allowed to directly send an NAS session management message (to request setup, modify, or deactivate an EPS bearer context) before sending an NAS service request or a similar NAS message such as an NAS service update. The extended NAS service request may be used to request the activation or the deactivation of a dormant behavior.

Similar to the extended NAS service request described above, a new NAS service update message may be introduced to modify the WTRU's dedicated resources, and/or request activation or deactivation of a dormant behavior. The behavior of the NAS service update may be similar to that described above for the extended NAS service request.

The WTRU may perform any of the embodiments described above related to mobility management at the NAS layer to request additional user plane resources or to perform NAS session management procedures. Additionally or alternatively, the WTRU may perform any of the following one or combination of the embodiments. The WTRU may perform management of radio bearer that may be used while in a dormant mode (e.g., XRB). For example, the WTRU may perform setup or reactivation of at least one radio bearer, or teardown or deactivation of at least one radio bearer. The WTRU may perform management of radio bearers that may be used when the WTRU exits a dormant mode (e.g., one or more EPS RABs). The WTRU may perform set-up or reactivation of at least one radio bearer or teardown or deactivation of at least one radio bearer.

The NAS service request procedure is conventionally used for a WTRU in an idle mode. Extensions to session management may be defined to allow operation with a dormant behavior. Embodiments are provided herein to allow a WTRU in a dormant mode to request more resources for other bearers. This implies resource allocation on both the radio and the S1 interfaces, thereby necessitating the MME to be aware of this request so that both radio and S1 resources are set up.

The WTRU may perform at least one of the following procedures while in a dormant mode for the management of radio bearers.

In one embodiment, the WTRU may perform WTRU-initiated NAS service request or NAS service update while in a dormant mode. The WTRU may initiate an NAS procedure with the MME to modify the user plane resources.

For example, the WTRU may send an NAS message (e.g., either the extended NAS service request or a NAS service update) to indicate to the MME that user plane resources, (e.g., for at least one dedicated bearer), are needed. The NAS message may include a list of dedicated bearers for which resources are requested, and may include a time or flag parameter that may be used to indicate the duration of the time for which resources are needed. For example, a specific application at the WTRU may require transmission of relatively large amount of data in a short period of time (e.g., via successive transmissions) such that the resources are not needed after a specific time interval. The setup of resources for the requested bearer(s) may result in the WTRU exiting a dormant mode. Alternatively, the transmission of the NAS message may result in the WTRU exiting or deactivating the dormant mode. The WTRU may subsequently receive an NAS message, confirming the receipt of the WTRU's NAS request, which may inform that the WTRU may exit or deactivate the dormant mode. The setup of resources for the requested bearer(s) may result in the WTRU exiting a dormant mode.

The MME may receive the NAS message (e.g., either the extended NAS service request or a NAS service update) from the WTRU. When the MME receives the NAS message, the MME may establish the user plane for EPS bearers that are active in the WTRU's context. The MME may be aware that the WTRU is in a dormant mode. Alternatively, the received NAS message may include an indicator as to which EPS bearers require user plane resources. The MME may take into account a time factor or other parameter that may be included in the NAS message such that resources are set up for a specific period of time. The MME may subsequently inform the serving eNB (via S1AP interface, using existing or new messages) to set up resources for at least one dedicated and/or default bearer. The MME may include additional parameters such as time interval during which the resources should be maintained in the control signaling towards the eNB. The MME may run a timer with the indicated value such that after its expiry, the MME may inform the eNB to release the resources for one or more dedicated and/or default bearer. The MME may send a message to the WTRU, confirming the receipt of the NAS message, and may inform the WTRU to exit a dormant mode.

The eNB may receive the S1AP message (new or existing) from the MME to set up resources for the WTRU in a dormant mode. The eNB may then reconfigure the WTRU to exit a dormant mode. The eNB may start a timer, as per indication in the received message, such that the resources to be setup may be released after expiry of the timer. The eNB may reconfigure the WTRU to operate in a dormant mode after the expiry of this timer.

In another embodiment, the MME may initiate the NAS request described above.

In another embodiment, the NAS may provide information about the type of request to the RRC, (for example, user plane resource setup, NAS session management signaling, NAS signaling, etc.). The WTRU RRC may send an RRC message to the eNB to request the transition from a dormant mode, for example, upon a trigger to exit a dormant mode. Alternatively or additionally, the WTRU RRC may inform the eNB about the pending request without necessarily requesting to exit a dormant mode. It may include information about higher layer (e.g., NAS) requests.

The eNB receives the RRC message from the WTRU in a dormant mode. The RRC message may include an indication to exit a dormant mode, or alternatively an indication related to NAS protocol. The eNB may then make a decision to transition the WTRU from a dormant mode, based on previous configuration that may have been received, (e.g., from the MME). For example, when the WTRU was initially put in a dormant mode, the MME may have informed the eNB that any future requests to setup resources for additional bearers may be granted without a permission from the MME. Alternatively, the MME may inform the eNB that any transition from a dormant mode (or into dormant mode) may require a permission from the MME.

The eNB may inform the MME about the pending request. This may be a permission to exit the WTRU from a dormant mode. Alternatively, the eNB may forward additional information to the MME as received from the WTRU. For example, if the eNB had received a message to setup resources for at least one dedicated bearer, the eNB may indicate to the MME that the WTRU needs additional resources for at least one dedicated bearer. The eNB may then wait for the MME to accept or reject the request before proceeding. The eNB may include tunnel endpoint identities (TEIDs) that may be used by the serving gateway (SGW) for S1-U resource path. The MME may forward this information to the SGW if the request is granted. Moreover, the MME may forward TEIDs to the eNB (as received from the SGW) so that user plane path for uplink data may be setup.

The RRC procedure described above may apply if the NAS is not allowed to transmit a service request or other message if the dormant mode is a sub-state of the connected mode.

Figure 5:
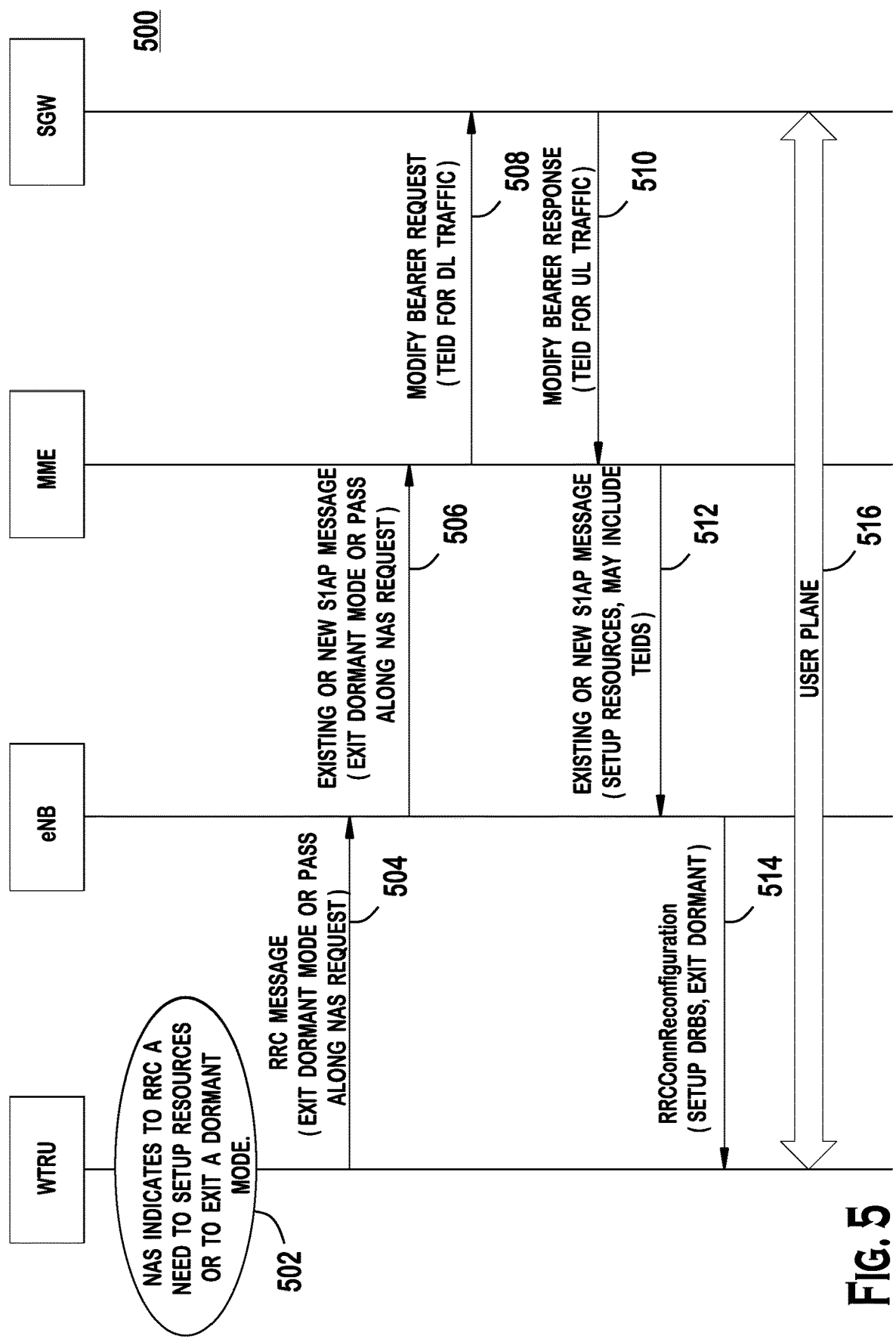
FIG. 5 is a signaling diagram of an example process for session management in accordance with one embodiment.

FIG. 5 is a signaling diagram of an example process 500 for session management in accordance with embodiment disclosed above. A WTRU NAS (EPS session management (ESM) or EPS mobility management (EMM)) detects an event to exit a dormant mode (e.g., due to a request from the ESM layer or from the applications to setup resources), and sends an indication to the WTRU RRC to setup resources or exit a dormant mode (502).

The RRC in the WTRU may then send an RRC message to the eNB with an indication (e.g., a new IE) indicating the desire to exit a dormant mode of operation (504). Alternatively, the WTRU (i.e., NAS) may transmit an NAS message (new or existing) to the network to indicate the desire for exiting a dormant mode.

The eNB sends a new or existing S1AP message to the MME with a new IE to indicate the WTRU's request to exit a dormant mode (506). The S1AP message may include TEIDs.

The MME after receiving this message may verify the IE and may accept the request to exit a dormant mode. Alternatively, if the MME receives an NAS message from the WTRU, the MME verifies the NAS request and may accept the WTRU request to exit a dormant mode. The MME may then trigger the bearer modification procedure towards the SGW (508). The SGW may in turn trigger the bearer modification procedure towards the PDN GW (not shown), and sends a bearer modification response to the MME (510).

The MME responds to the eNB with a new or existing S1AP message that may include a new IE to indicate the result of the request to exit a dormant mode (512). This message may indicate to the eNB a list of RABS and hence radio bearers that should be setup for the WTRU. Alternatively, the MME may respond with an NAS message towards the WTRU.

The eNB may then send a new or existing RRC message to the WTRU to indicate the result of the request to exit a dormant mode (514). The eNB may request the WTRU to perform RRC reconfiguration to add other data radio bearers which implicitly indicates the acceptance to exit a dormant mode.

The WTRU RRC may then change its state or other parameters to reflect the exit of a dormant mode. The RRC may indicate to the NAS that dormant mode operation has been exited which may cause the NAS to change states or parameters to reflect this change.

Alternatively, if the WTRU receives an NAS message from the MME, the WTRU verifies the result of the request to exit a dormant mode, and if the request is accepted, the WTRU NAS may change its state or other parameters to reflect the exit of the dormant mode. The WTRU NAS may indicate to the WTRU RRC that dormant mode may be exited. The WTRU NAS may in turn trigger the RRC to change any RRC states. The WTRU may then use data radio bearers that are setup for operation in a normal mode (i.e., not a dormant mode) for user plane traffic (516).

Alternatively, the eNB may initiate an RRC request, similarly as described above for the WTRU.

Events occurring in the NAS layer may cause a transition from a dormant mode to a non-dormant mode, and vice-versa.

When a WTRU enters a dormant mode (which may be realized as a subset of RRC connected mode or a separate RRC state), the NAS may be made aware of this so that the appropriate actions may be taken. For example, in a dormant mode, the NAS may send a new message (e.g., service update) to request resources for dedicated bearers and hence exit a dormant mode.

The RRC and the NAS may interact upon transition to or from a dormant mode at each entity. A change in a dormant mode operation may imply transition from or to a dormant mode of operation at the RRC and/or the NAS.

The RRC may inform the NAS about the change in a dormant mode operation. For example, when the RRC enters a dormant mode of operation, the RRC may inform the NAS (EMM or ESM) about the transition into a dormant mode. This indication may be valid for a given period of time that is either known to the NAS or signaled by the RRC. Similarly, the RRC may inform the NAS about the transition from a dormant mode into a normal mode of operation.

If the NAS is aware of entering or leaving a dormant mode, and if such transition may be triggered or controlled by the NAS, the NAS may inform the RRC (or any other layer e.g., ESM or lower layers such as MAC) about any transition into or out of the dormant mode.

An entity, such as the NAS, upon receiving an indication about transitioning into a dormant mode (e.g., from the RRC or from any other entity such as the MME), may use or set a parameter that indicates the current mode of operation in the WTRU. For example, upon receipt of an indication that the WTRU is operating in a dormant mode, the NAS may define or use a flag or any other parameter that indicates the WTRU's mode of operation. A dormant flag may be defined, (e.g., a Boolean parameter), where TRUE (or 1) may indicate that the WTRU is in a dormant mode, and FALSE (or 0) may indicate that the WTRU is in a normal mode (i.e., not in a dormant mode). This behavior may apply to other entities/layers in the WTRU (e.g., the RRC, the MAC, or the ESM entity of the NAS).

The indication to the NAS may be from lower layers (e.g., RRC), or may be from other network entities such as the MME. For example, if the NAS receives an indication about a dormant mode operation or a request to enter a dormant mode from the MME, the NAS may set a flag (or another parameter) as described above to know that the WTRU is operating in a dormant mode. Similarly, a request to exit a dormant mode or an indication about the exit of a dormant mode that may be received from the MME may result in the WTRU changing the value of the dormant flag (or any parameter) such that a normal mode of operation is initiated.

At any time of operation, the NAS may verify whether or not the WTRU is operating in a dormant mode, either using a flag or a state, or any other method. The NAS may then behave according to the WTRU's current mode of operation. The NAS may further verify if this state is considered as part of NAS EMM-IDLE or EMM-CONNECTED, or any other state. For example, if the NAS is aware of a dormant mode of operation the NAS may send a service update message for requesting resources for dedicated bearers. This may be done if the dormant mode is realized as a subset of EMM-CONNECTED. Alternatively, it may be done regardless of the actual state that realizes the dormant behavior. Alternatively, the NAS may be allowed to send a service request in a dormant mode. Both the service update and service request messages may be used. The NAS (EMM or ESM) may prohibit further ESM requests when in a dormant mode. This may be done for a defined period of time as per indication from lower layers or from the network.

At any time of operation, if the NAS identifies that the WTRU is not operating in a dormant mode, the NAS may avoid using the service update message, except it should be sent to inform the MME that the WTRU NAS is entering a dormant mode.

The NAS may, based on any triggers to enter a dormant mode or based on a lower layer request to enter a dormant mode, send a message to the MME to inform the MME about the WTRU NAS operation in a dormant mode. The NAS may then enter a new state or keep a flag that indicates operation in a dormant mode. The NAS may enter a new state or keep the flag after a confirmation or acknowledgement from the MME. The NAS may notify lower layers or other entities (e.g., ESM) that the WTRU is operating in a dormant mode.

Alternatively, based on an indication received from the WTRU, or based on a trigger in the MME, the MME may request the eNB to put the WTRU in a dormant mode of operation. This may be done using S1AP messages (e.g., WTRU CONTEXT MODIFICATION REQUEST) or any new message with an IE defined to indicate that the eNB needs to put the WTRU in a dormant mode. Upon reception of a request from the MME to put the WTRU in a dormant mode, the eNB may then indicate to the WTRU to enter a dormant mode using RRC messaging. The MME may send an NAS message to indicate to the WTRU that a dormant mode is now active. Alternatively, the NAS in the WTRU may be notified by the RRC or any other layer.

Triggers may be defined to put the WTRU in a dormant mode of operation (where the realization of dormant mode may be either at the NAS, at the RRC, or both). In one embodiment, the session management entity (e.g., NAS ESM) may observe that the WTRU is transmitting packets that have certain characteristics (e.g., a specific or maximum packet size, or specific inter-packet (or burst) arrival time, or any other defined characteristic or their combination). The session management entity may, as a result of observing certain traffic pattern, install packet filters (locally and/or via signaling with the MME) such that certain traffic packets may be grouped into at least one bearer, which may be the XRB. Alternatively, the WTRU may send a new session management message to the MME to inform/request operation in a dormant mode.

The session management entity in the WTRU may wait for an acknowledgement before operating in a dormant mode. The acknowledgement may be in the form of acknowledging the installment of packet filters in the uplink and/or downlink, or it may be in the form of a request to install a packet filter at the WTRU. The acknowledgement may be in the form of new session management message. The acknowledgement may be sent by the network (e.g., the MME).

The session management entity may receive an indication to enter a dormant mode and as a result may perform the predefined actions. The indication may be local, for example, from applications or from other entities in the WTRU such as, but not limited to, user plane entities (e.g., the PDCP entity), which may have a functionality to observe certain traffic patterns. The indication may be received from another entity in the network, for example, from the session management entity in the network (i.e., the MME).

The session management entity may (e.g., NAS ESM), due to a trigger to enter a dormant mode, indicate to the mobility management entity (e.g., NAS EMM) that the WTRU now enters a dormant mode. The EMM may perform the predefined actions due to an indication from the ESM to enter a dormant mode or due to the same triggers defined above (i.e., the actions defined above may be apply to the EMM).

Figure 6:
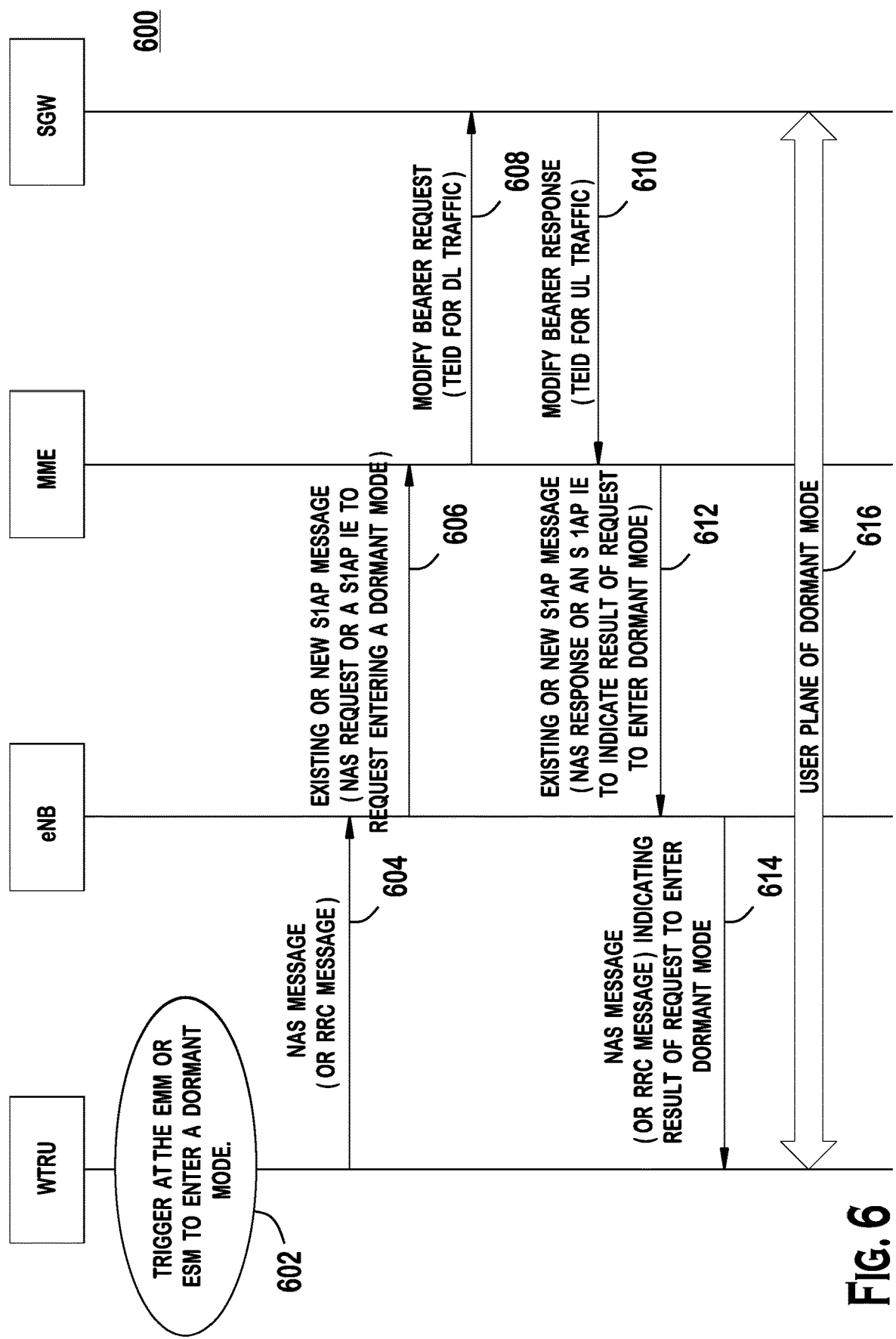
FIG. 6 is a signaling diagram of an example process of entering a dormant mode in accordance with one embodiment.

FIG. 6 is a signaling diagram of an example process 600 of entering a dormant mode in accordance with one embodiment. Upon trigger at the WTRU (e.g., ESM or EMM entity of the NAS), the NAS (ESM or EMM) decides to operate in a dormant mode (602). The trigger may be the detection of transmission of small packets or any other triggers.

The NAS (ESM or EMM) transmits an NAS message to the network (eNB) (604). The NAS message may be an ESM message, for example, to install packet filters or an EMM message which may be defined to request a dormant mode operation. Alternatively, the NAS may interact with the RRC to indicate the need to enter a dormant mode without necessarily providing a NAS message for transmission. In this case, the RRC may send an RRC message to the eNB with an information element IE that indicates that the WTRU wants to enter a dormant mode.

The eNB forwards the received NAS message to the MME (606). Alternatively, if the eNB receives the RRC message with the IE indicating request to enter a dormant mode, the eNB may send an existing or new S1AP message with the new IE (e.g., with a value set to that received from the WTRU) towards the MME. The message may include TEIDs.

The MME may accept or reject the request based on configurations in the network. If the MME accepts the request, the MME may trigger the modification of the bearers towards the SGW (608). The SGW may initiate bearer modification towards the PDN GW (not shown), and send a bearer modification response to the MME (610). The MME may respond to the request to enter a dormant mode by sending an NAS message (EMM or ESM) to the eNB with the result of the request (612). Alternatively, the MME may inform the eNB via existing or new S1AP message about the result of the request to enter a dormant mode. The message may include TEIDs.

The eNB forwards any received NAS message to the WTRU (614). The WTRU verifies the NAS (ESM or EMM) message for the result of the request to enter a dormant mode. If the result indicates that a dormant mode is accepted, the NAS may enter a dormant mode. The NAS may additionally indicate to the RRC that the WTRU needs to operate in a dormant mode. The RRC may enter a dormant state. The WTRU may install packet filters if requested by the NAS message.

Alternatively, the eNB may send an RRC message with an IE indicating the result of the dormant mode request. The RRC verifies the message and may inform the NAS about the response. The NAS and/or the RRC may then enter a dormant state and/or set a certain flag accordingly to reflect the dormant mode behavior if the results indicates so. User plane data may be transferred between the WTRU and the SGW in a dormant mode (616).

Embodiments for per-flow access barring in a dormant mode are disclosed hereafter. The increase in an intermittent background traffic from a large population of inactive WTRUs may significantly contribute to generation of excessive load in the system, in particular during peak times where other WTRUs may be active with services and/or data of higher priority. Such load may include user plane traffic, access attempts on an RACH, and control plane signaling, etc. The RACH overload may pre-empt higher priority data to be served. Control plane signaling related to radio resource management (RRM) of background services may pre-empt useful user plane traffic for high priority services.

For WTRUs with an established RRC connection and/or with configured dedicated resources, the network may use a combination of QoS configuration parameters (per radio bearer) and scheduling priorities (between RABs of a given WTRU and/or between different WTRUs) to ensure that QoS requirements for different services are met in a cell. Alternatively, the network may update the packet filters such that one or more flows are discarded by the WTRU, which requires involvement from the MME (NAS) to address a problem (congestion) experienced by the eNB.

For WTRUs with an established RRC connection and/or with configured dedicated resources, the network may redistribute WTRUs to other cells (using a handover) or release the WTRU RRC connection (using the RRC connection release procedure possibly with redirection to another cell) in case of overload in the system (e.g., few or no resources available to serve higher priority data or WTRUs).

For WTRUs in an idle mode, the network may either signal in the system information parameters that affect the behavior of WTRU's cell (re)selection procedure (such that the cell has a lower likelihood of being selected), or use mechanisms such as extended cell barring by which particular type of services may be temporarily pre-empted access to the cell while others are allowed (e.g., emergency calls). Extended cell barring relies on broadcast of system information and is applicable in the IDLE mode, and the classes are defined per WTRU.

Embodiments for delaying or pre-empting one or more WTRUs to access the system for a given period of time in combination with the use of a dormant behavior are disclosed hereafter. The embodiments may allow the network to perform some form of back-off for data associated to certain types of services and/or to perform graceful degradation of such services provided to one or more WTRUs, (e.g., for WTRUs that are using a dormant behavior and/or for WTRUs configured with at least one XRB).

In the embodiments, back-off may be applied for certain types of services in combination with packet filters and/or radio bearer configuration. The embodiments may be applied in the RRC CONNECTED or RRC IDLE mode (e.g., with dormancy behavior such as packet filters and RAB configuration that may remain in the WTRU's configuration), or in the RRC DORMANT mode.

The embodiments may be useful when the system reaches an excessive load, by which data with higher priority may no longer be served in the cell and/or admission control may no longer accept further connections. Such conditions may be due to the system reaching the maximum number of possible RRC connections, due to insufficient system capacity, due to congestion of the control channels, and/or due to congestion on the random access channels.

When back-off is applied, a WTRU may not access the system and/or perform a request for uplink resources (e.g., scheduling request using either dedicated resource or random access, or a preamble transmission in the WTRU-specific PRACH occasion) for the user data to which the back-off function is applicable. Alternatively, the WTRU may delay any request related to the user data for which the back-off function is applicable until a certain amount of data (that may be configurable) is available for transmission in the WTRU's buffer. Alternatively, the WTRU may refrain from sending any request related to the user data for which the back-off function is applicable for data in excess of the prioritized bit rate, or for DRBs of the WTRU's configuration.

The WTRU may be configured to determine one or more flows to apply the back-off function (hereafter referred to as "applicable flows"), for example, based on at least one of XRB, packet filters, service type and/or QoS parameters, or the like, (which may be given as part of a DRB configuration).

The WTRU may be configured to determine when to apply the back-off function to the applicable flows, for example, based on at least one of a WTRU dormant behavior, a WTRU state (e.g., a RRC DORMANT state), an implicit indication, an explicit indication from the network (e.g., an overload indication broadcasted as part of system information and/or a indication of the allowed service class in the cell), a specific subframe (e.g., a scheduling occasion), or the like.

The WTRU may be configured to determine how long to apply the back-off function for the applicable flows. The WTRU may apply the back-off function for a specific (configurable) amount of time. The WTRU may apply the back-off function until the back-off function is no longer applicable, e.g., when it no longer meets predefined conditions, when the WTRU changes an RRC state, and/or when the dormant behavior is no longer applicable. In addition, the WTRU may stop applying the back-off function when a mobility event occurs (change of serving cell) either from a cell (re)selection procedure that result in a different serving cell or from the reception of a RRC connection reconfiguration with a mobility control IE (e.g., handover).

If the WTRU performs any uplink transmission that includes a BSR while a back-off function is applied to some of its radio bearers, the WTRU may report a non-zero amount of data for those radio bearers in a BSR, if applicable.

A traffic class may represent a relative priority among different service classes, (e.g., highest priority, high priority, medium priority, low priority, lowest priority). The priority may be according to an assigned integer, for example, [15, . . . , 0] where 15 may represent the highest priority. The traffic class may be a priority associated to a logical channel group (LCG) associated to the radio bearer's configuration, if applicable.

In a dormant mode, the WTRU may pre-empt requests for DRBs assigned with a low traffic class. For example, the WTRU may be configured with a plurality of DRBs and one or more DRBs may be associated with an XRB. The XRB may be associated with a traffic class. Alternatively, a DRB may be associated with a traffic class. When operating in a dormant mode, the WTRU may apply a back-off function for data corresponding to a traffic class below a configured value, (e.g., the WTRU may not initiate a request for uplink resources to the network). This may be applied when a period for which the WTRU determines that the serving cell is in an overloaded condition, for example, from reception of system broadcasting information. If the WTRU performs an uplink transmission for a radio bearer of a higher traffic class, which transmission may include a BSR, the WTRU may report in a BSR the amount of data for the DRBs corresponding to the lower traffic class.

In another embodiment, in a dormant mode, the WTRU may pre-empt requests for data in excess of the DRBs PRB. For example, the WTRU may be configured with a plurality of DRBs and a DRB may be associated with a traffic class. In a dormant behavior, the WTRU may apply a back-off function for data corresponding to a traffic class below a configured value such that the WTRU may not initiate a request for uplink resources to the network for data for the applicable DRBs in excess of the PRB. This may be applied when the serving cell is in a condition of overload, that may be determined based on reception of system broadcasting information.

A WTRU may be configured with a plurality of packet filters. Each packet filter may be associated with an index, (e.g. starting from 0 and up). The WTRU may have one packet filter active at any time. The WTRU may consider the packet filter with the lowest index as a default packet filter. The WTRU may change the active packet filter based on an indication received from the network. This indication may be received in the system information broadcast. The system information broadcast may signal an index applicable to the WTRUs configured with a plurality of packet filters in the cell. A WTRU may use a packet filter different than the default packet filter if it operates in a dormant mode. If a WTRU is configured with a number of packet filters and the highest configured index is smaller than the value indicated by the system broadcasting, the WTRU may use the index with the highest value.

The TDF-based control plane policing may consider the following cases: network-based and WTRU-based. In the network-based TDF-based control plane policing, the unwanted user plane traffic patterns are identified at the network (e.g., the PGW) and then the network correlates these patterns with potential control plane events that may cause unwanted system behavior. The network may then take actions to mitigate relevant control plane congestion. In the WTRU-based TDF-based control plane policing, the WTRU detects the unwanted user plane traffic pattern and either notifies this behavior to the network for the network to take an action to correlate control plane events and mitigate possible unwanted system behavior, or enforces ADC-rules by correlating user plane traffic patterns with control plane events and mitigate potentially harmful/undesirable control plane events.

Figure 7:
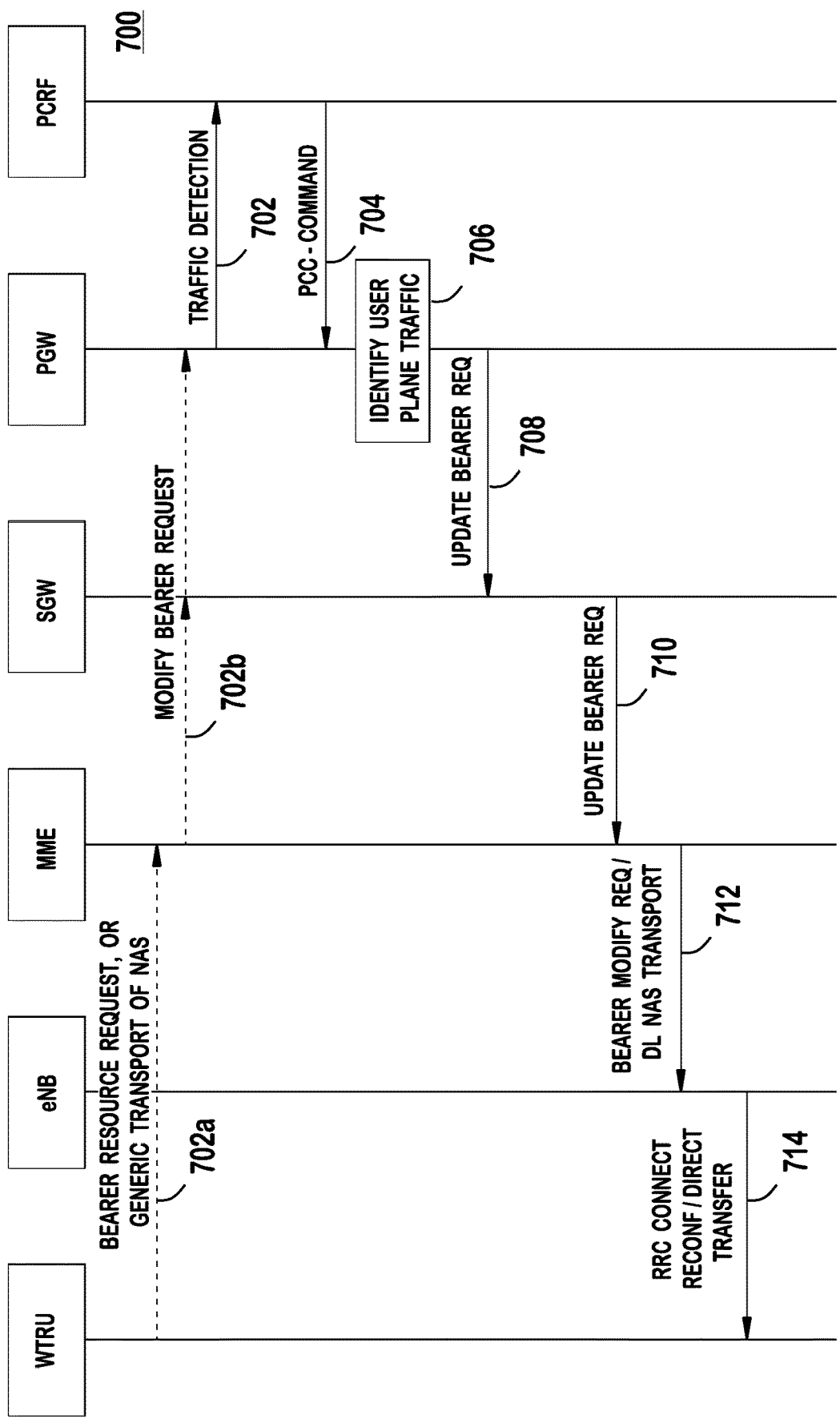
FIG. 7 shows an example procedure for traffic detection function (TDF)-based control plane policing in accordance with one embodiment.

FIG. 7 shows an example procedure for TDF-based control plane policing in accordance with one embodiment. FIG. 7 shows both network-based and WTRU-based TDF-based control plane policing.

Based on rules set by the PCRF or preconfigured by an operator, the PGW may detect a traffic pattern. Upon detection of the traffic pattern, the PGW reports this event to the PCRF (702). The PCRF receives the traffic detection information and configures application detection and control (ADC) rules in the PGW (704). The PGW uses these rules to identify potential user plane traffic that may be later correlated with control plane events (706). For example, the TDF in the PGW uses the provided rules to identify the application within the service data flows by using an application ID provided by the PCRF as part of the ADC rules.

If the PGW identifies a specific pattern according to the rules, the PGW may notify control plane management entities about the user plane unwanted behavior that may be correlated at the control plane management entity to determine corrective actions. The corrective actions include, but are not limited to, preventing certain control plane events such as sending a new service request or a new RRC connection request for the purpose of establishing a new connection. The PGW passes this notification to the MME, for example, by sending an update bearer request through the SGW (708, 710).

The MME correlates the traffic detection information with the known signaling patterns. The MME may then send an E-RAB MODIFY REQUEST or DL NAS TRANSPORT message to either setup a new dormant bearer to prevent the establishment and tearing down of short-lived connection for the purpose of sending a few bytes, setup a new filter to direct packets to an existing dormant bearer, or to communicate/notify the traffic pattern identification to the eNB for the eNB to take further actions depending resource availability (712).

Alternatively, the MME send an E-RAB MODIFY REQUEST or DL NAS TRANSPORT message or similar message to initialize a back-off timer in the WTRU to prevent any new control plane message for the duration of the back-off timer (712). The eNB may then forward this timer to the WTRU via RRC signaling (714). Alternatively, the MME may send the timer to the WTRU directly via NAS signaling.

The back-off timer may be applied to specific control plane messages, such as a service request (i.e., when provided with this timer, the WTRU may not send a service request (for any service) for the duration of the timer). Alternatively, the WTRU may be allowed to send a service request for voice calls, emergency calls, or other services. What services are allowed and what services are not allowed may be provided to the WTRU.

Alternatively, the back-off timer may be applied to specific traffic classes, or specific bearers or flows. For example, when the WTRU is provided with a back-off timer, the WTRU may not transition to a connected mode for traffic generated on a specific bearer or for a specific flow. Alternatively, the back-off timer may be applied to the entire WTRU.

For the WTRU-based TDF-based control plane policing, the WTRU is configured with the ADC rules or the filtering information may be provided to the WTRU, for example, during a bearer establishment. The WTRU uses these rules to detect traffic patterns. Once the traffic pattern is detected, the WTRU may send notification towards the PCRF (or any other node, such as the MME) using, for example, a bearer resource request or a generic transport of NAS messages (or any session or mobility management NAS message) (702a). The WTRU may provide this indication to the MME, which may then forward it to the PCRF via the SGW and the PGW using the CN messages, such as a modify bearer request message. Alternatively, a new message may be defined between these nodes. Once this message (i.e., triggers from the WTRU) is received by the PCRF, the PCRF may take the actions as in the operations 702-714 in FIG. 7.

Figure 8:
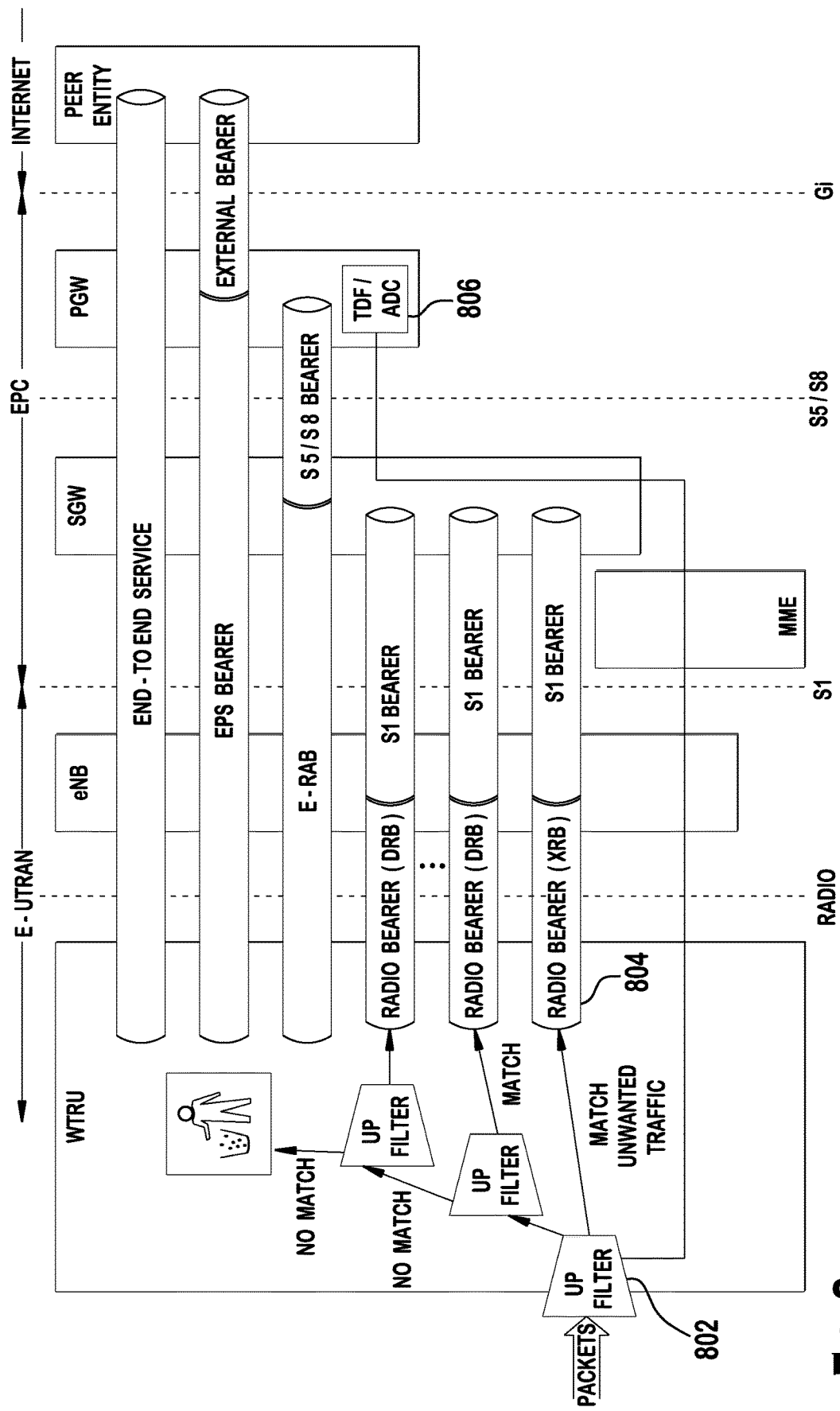
FIG. 8 shows routing of the packets from the unwanted flow to a particular radio bearer.

Alternatively, the WTRU may use the configured ADC rules to enforce some of the actions. The WTRU may trigger the request of a dormant bearer as disclosed above. Alternatively, the WTRU may route packets from the unwanted flow to a dormant bearer. FIG. 8 shows routing of the packets from the unwanted flow to an XRB. The user plane filter 802 in the WTRU, which may be controlled in accordance with the TDF/ADC 806 configured by the PGW, routes the matched traffic to the XRB 804.

Alternatively, the WTRU may back-off for the duration of a preconfigured time, refraining from sending specific control plane messages for a specific flow or bearer, or sending any control plane messages for the duration of the preconfigured timer.

Paging may be used to transmit paging information to a WTRU in RRC_IDLE and/or to indicate to a WTRU in RRC_DORMANT the availability of downlink data for the WTRU. Paging may be used to inform WTRUs in RRC_IDLE, RRC_DORMANT, and RRC_CONNECTED about a system information change, to inform about an ETWS primary notification and/or ETWS secondary notification, and/or to inform about a CMAS notification.

The paging information is provided to upper layers, which in response may initiate RRC connection establishment, e.g., to receive an incoming call. The upper layers may in response resume decoding of downlink control signaling at the physical layer (e.g., to receive a short unicast data transfer).

The network may initiate the paging procedure by transmitting the paging message at the WTRU's paging occasion. The network may address multiple WTRUs within a paging message by including one paging record for each WTRU. The network may indicate a change of system information, and/or provide an ETWS notification or a CMAS notification in the paging message.

Upon receiving the paging message, if in RRC_IDLE, for each of the paging record, if any, included in the paging message, if the WTRU-Identity included in the paging record matches one of the WTRU identities allocated by upper layers, the WTRU may forward the WTRU-Identity and the cn-Domain to the upper layers.

Upon receiving the paging message, if in RRC_DORMANT, for each of the paging record, if any, included in the paging message, if the WTRU-Identity included in the paging record matches one of the WTRU identities allocated by upper layers, the WTRU may indicate to the lower layers that monitoring of downlink control signalling may be resumed.

If the systemInfoModification is included, the WTRU may re-acquire the system information using the system information acquisition procedure. If the etws-Indication is included and the WTRU is ETWS capable, the WTRU may re-acquire SystemInformationBlockType1 immediately, i.e., without waiting until the next system information modification period boundary. If the schedulingInfoList indicates that SystemInformationBlockType10 is present, the WTRU may acquire SystemInformationBlockType10. If the schedulingInfoList indicates that SystemInformationBlockType11 is present, the WTRU may acquire SystemInformationBlockType11. If the cmas-Indication is included and the WTRU is CMAS capable, the WTRU may re-acquire SystemInformationBlockType1 immediately, i.e., without waiting until the next system information modification period boundary. If the schedulingInfoList indicates that SystemInformationBlockType12 is present, the WTRU may acquire SystemInformationBlockType12.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method implemented by a wireless transmit receive unit (WTRU), the method comprising:
receiving a radio resource control (RRC) message, wherein the received RRC message includes configuration information for an RRC dormant mode for the cell, wherein during the RRC configured dormant mode the WTRU will cease monitoring for transmissions on the physical downlink control channel (PDCCH);
receiving a first downlink control information (DCI) signal indicating to enable the RRC configured dormant mode, wherein the RRC configured dormant mode is different from a DRX cycle, wherein at least one bit of the first DCI is for enabling RRC configured dormant mode;
transmitting channel quality indicators (CQIs) for the cell, while the WTRU is in the RRC configured dormant mode; and
receiving a second DCI signal indicating to disable the RRC configured dormant mode, wherein receiving the first or second DCI signaling is performed while the WTRU is in an RRC Connected mode.

2. The method of claim 1, wherein when the WTRU is in the RRC configured dormant mode for the cell then the WTRU partially deactivates uplink data transmissions excluding uplink data transmissions for the CQIs for the cell.

3. The method of claim 1, wherein the RRC configured dormant mode for the cell provides power savings for the WTRU.

4. A wireless transmit receive unit (WTRU), the WTRU comprising:
a transceiver operatively connected to a processor,
the transceiver and processor configured to receive a radio resource control (RRC) message, wherein the received RRC message includes configuration information for an RRC dormant mode for the cell, wherein during the RRC configured dormant mode the WTRU will cease monitoring for transmissions on the physical downlink control channel (PDCCH);
the transceiver and processor are configured to receive a first downlink control information (DCI) signal indicating to enable the RRC configured dormant mode, wherein the RRC configured dormant mode is different from a DRX cycle, wherein at least one bit of the first DCI is for enabling RRC configured dormant mode;
the transceiver and processor configured to transmit channel quality indicators (CQIs) for the cell while the WTRU is in the RRC configured dormant mode; and
the transceiver and processor are configured to receives a second DCI signal indicating to disable the RRC configured dormant mode, wherein receiving the first or second DCI signaling is performed while the WTRU is in an RRC Connected mode.

5. The WTRU of claim 4, wherein when the WTRU is in the RRC configured dormant mode then the WTRU partially deactivates uplink data transmissions excluding uplink data transmissions for the CQIs for the cell.

6. The WTRU of claim 4, wherein the RRC configured dormant mode for the cell provides power savings for the WTRU.

* * * * *